US008293459B2

(12) United States Patent
Inamiya et al.

(10) Patent No.: US 8,293,459 B2
(45) Date of Patent: *Oct. 23, 2012

(54) PHOTO-CURABLE TRANSFER SHEET, PROCESS FOR THE PREPARATION OF OPTICAL INFORMATION RECORDING MEDIUM USING THE SHEET, AND OPTICAL INFORMATION RECORDING MEDIUM

(75) Inventors: Takato Inamiya, Tokyo (JP); Hidefumi Kotsubo, Tokyo (JP); Hideki Kitano, Tokyo (JP); Kenji Murayama, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 728 days.

This patent is subject to a terminal disclaimer.

(21) Appl. No.: 12/440,976

(22) PCT Filed: Sep. 14, 2006

(86) PCT No.: PCT/JP2006/318262
§ 371 (c)(1),
(2), (4) Date: Mar. 12, 2009

(87) PCT Pub. No.: WO2008/032382
PCT Pub. Date: Mar. 20, 2008

(65) Prior Publication Data
US 2010/0178467 A1     Jul. 15, 2010

(51) Int. Cl.
*G11B 7/245* (2006.01)
*B32B 27/30* (2006.01)
*C08L 33/08* (2006.01)

(52) U.S. Cl. .................. 430/321; 430/281.1; 430/280.1

(58) Field of Classification Search .................. None
See application file for complete search history.

(56) References Cited

U.S. PATENT DOCUMENTS

| | | | |
|---|---|---|---|
| 4,499,163 A * | 2/1985 | Ishimaru et al. | 430/5 |
| 2003/0124436 A1 * | 7/2003 | Shioda et al. | 430/1 |
| 2004/0257972 A1 * | 12/2004 | Kitano et al. | 369/275.5 |
| 2005/0158500 A1 * | 7/2005 | Kitano et al. | 428/40.1 |
| 2007/0218374 A1 * | 9/2007 | Kitano et al. | 430/14 |

FOREIGN PATENT DOCUMENTS

| | | | |
|---|---|---|---|
| EP | 254230 | * | 1/1988 |
| EP | 0530141 | * | 3/1993 |
| EP | 1674505 | * | 6/2006 |

(Continued)

OTHER PUBLICATIONS

Ulrich "Unsaturated Isocyanates", Chapter 1.2 in "Chemistry and Technology of isocyanates" (pp. 148-151) (1996).*

*Primary Examiner* — Martin Angebranndt
(74) *Attorney, Agent, or Firm* — Sughrue Mion, PLLC

(57) ABSTRACT

The present invention provides a photo-curable transfer sheet by which an optical information recording medium (e.g., DVD) having small thickness and high capacity can be advantageously prepared, and which is improved in transferring property of pits and the like and curing property. The photo-curable transfer sheet has a photo-curable transfer layer comprising a photo-curable composition deformable by application of pressure, wherein the photo-curable composition comprises a polymer having a glass transition temperature of not less than 80° C. and a reactive diluent having a photopolymerizable functional group. The invention also provides a process for the preparation of an optical information recording medium using the sheet, and the optical information recording medium.

29 Claims, 5 Drawing Sheets

FOREIGN PATENT DOCUMENTS

| | | | |
|---|---|---|---|
| EP | 2 058 809 A1 | | 5/2009 |
| JP | 10-298390 | * | 11/1998 |
| JP | 2003-123332 A | | 4/2003 |
| JP | 2003-272244 A | | 9/2003 |
| JP | 2005-182963 A | | 7/2005 |
| JP | 2005-182964 A | | 7/2005 |
| JP | 2005-182971 A | | 7/2005 |
| WO | 2005/035635 | * | 4/2005 |

* cited by examiner

PHOTO-CURABLE TRANSFER SHEET, PROCESS FOR THE PREPARATION OF OPTICAL INFORMATION RECORDING MEDIUM USING THE SHEET, AND OPTICAL INFORMATION RECORDING MEDIUM

BACKGROUND OF INVENTION

1. Field of the Invention

The present invention relates to an optical information recording medium, such as DVD (Digital Versatile Disc) or CD (Compact Disc), in which a large amount of information such as letters, sound and animation is recorded and/or recordable as digital signals, a process for the preparation thereof, and further a photo-curable transfer sheet advantageously utilized in the medium and process.

2. Description of the Related Art

As an optical information recording medium in which digital signals are in advance recorded by forming pits on its surface, CD and CD-ROM are widely used. Recently, DVD that the animation can be recorded and/or has been recorded by forming pits on its both (double) sides has been noted as the next generation recording medium instead of CD and increasingly used. Further, recordable discs such as CD-R, DVD-R and DVD-RW having groove(s) or grooves and pits thereon have been also increasingly used.

Conventional DVD having recording layers (surfaces) on its both sides includes, for example, a disc readable from double sides in which each of reflective layers is formed on a signal-pits surface of each of transparent resin substrates having the signal-pits surface on its one side, and the two transparent resin substrates are bonded to each other through an adhesive layer such that the reflective layers are faced to each other; and a disc readable from single side in which a semitransparent reflective layer is formed on a signal-pits surface of a transparent resin substrate while a reflective layer is formed on a signal-pits surface of another transparent resin substrate and the two transparent resin substrates are bonded to each other through an adhesive layer such that the semitransparent reflective layer and the reflective layer are faced to each other.

The DVD readable from double sides can be prepared, for example, by subjecting melted polycarbonate resin to injection molding by the use of a stamper having unevenness (concave and convex) corresponding to the reverse of unevenness of the signal-pits to be recorded on the substrate to prepare a transparent resin substrate having unevenness on its surface, forming a reflective layer on the uneven surface by spattering metal such as aluminum on it, and bonding two transparent resin substrates obtained in the above manner to each other through an adhesive such that the two reflective layers are faced to each other.

For example, a standardized specification of a next generation optical disc "Blu-Ray Disc" was proposed on Feb. 10, 2002. The specification mainly includes storage capacity of 23.3/25/27 GB, laser wavelength of 405 nm (violaceous laser), lens numerical aperture (N/A) of 0.85, disc diameter of 120 mm, disc thickness of 1.2 mm and track pitch of 0.32 μm.

In the Blu-Ray Disc, as mentioned above, the sizes of groove and pits are reduced, and therefore it is required to reduce a spot size of a reading laser. The reduction of the spot size results in that the reading is apt to be influenced by inclination of the disc, and hence even DVD having a little warpage cannot be reproduced (read out). In order to avoid the disadvantage, it may be effective to reduce a thickness of a substrate and make a thickness of a cover layer provided on pits surface on a laser-irradiation side to approx. 0.1 mm.

Nonpatent Document 1 (pp. 68) describes a process for the preparation of DVD suited to the above-mentioned requirements. The process is explained by referring to FIG. 8. A UV curable resin 5A is provided, by application, on a reflective layer (or recording layer) 6a of a disc substrate (1.1 mm) 4a having the reflective layer on its uneven surface, while a UV curable resin 5B is provided, by application, on a stamper 4b made of polycarbonate having uneven surface. Subsequently, after the substrate is turned over, the turned-over substrate and the stamper are put together, and the UV curable resins 5A, 5B are cured by irradiating ultraviolet beam from the stamper side. The stamper 4b is then removed from the cured UV curable resin 5B, a reflective layer (or recording layer) 6b is formed on the uneven surface and further a cover layer (thickness of approx. 0.1 mm) 7 is provided the reflective layer 6b.

In the process described in Nonpatent Document 1, a UV curable resin (layer) is provided on a disc substrate and a stamper by application, and the substrate is turned over and bonded to the stumper. Hence, the process is needed to perform complicated procedures including the application and turning over steps. In more detail, when the turned-over substrate and the stamper are put together through viscous UV curable resins, bubbles are generated in the vicinity of an interface of the combined UV curable resins. Hence it is difficult to successfully bond the UV curable resins of the substrate and stamper to each other. Furthermore, the UV curable resin is accompanied by large shrinkage on its curing, and hence the resultant medium is apt to have deformation such as warpage.

A process for the preparation of an optical information recording medium such as DVD capable of solving the above disadvantages is disclosed in Patent Document 1 (JP2003-272244 A). The process uses a photo-curable transfer sheet having a photo-curable transfer layer comprising a photo-curable composition, the photo-curable composition being deformable by application of pressure and containing a reactive polymer having a photopolymerizable functional group. In more detail, the photo-curable transfer sheet in the form of solid is used instead of the above UV curable resin when depression of the stamper, and therefore it is possible to transfer the uneven surface into the sheet to avoid the above disadvantages.

Further, Patent Document 2 (JP2003-123332 A) describes a sheet for an optical disc obtained by using a reactive polymer having a photopolymerizable functional group. A polymer having weight average molecular weigh (Mw) of 600,000, which is obtained by reacting acrylic resin with methacryloyloxyethyl isocyanate, is used for preparing the sheet for an optical disc.

Patent Document 1: JP2003-272244 A
Patent Document 2: JP2003-123332 A
Nonpatent Document 1: "NIKKEI ELECTRONICS", Nov. 5, 2001, pp. 68

BRIEF SUMMARY OF THE INVENTION

Problem to be Solved by the Invention

When the above-mentioned photo-curable transfer sheet or sheet for an optical disc is used for preparing an optical disc, these sheets show slow curing speed by UV exposure. Therefore, it is difficult that light energy (approx. 300 mJ/cm$^2$) generated by exposure time of approx. one second brings about sufficient cure of the sheets. In an actual process requiring such curing speed, hence, the sheets cannot be satisfactorily used. The sheet not sufficiently cured as above does not maintain the shape of pits formed by transferring to cause the shape of pits to deform with time. Further the sheet for an optical disc uses polymer having high glass transition temperature (Tg), which reduces transferring property of pits.

An object of the present invention is to provide a photo-curable transfer sheet by which an optical information recording medium (e.g., DVD) having small thickness and high capacity can be advantageously prepared, and which is improved in transferring property of pits and the like and curing property (curing rate).

Another object of the present invention is to provide a photo-curable transfer sheet by which an optical information recording medium (e.g., DVD) having small thickness and high capacity can be advantageously prepared, and which is improved in transferring property of pits and the like and curing property, and which brings about a roll of its continuous sheet that is free from exudation of the integrant of the photo-curable transfer layer and from the fluctuation of the thickness.

Further, an object of the present invention is to provide a process for the preparation of the optical information recording medium.

Furthermore, an object of the present invention is to provide a thin optical information recording medium obtained by the above-mentioned process.

Means for Solving Problem

The above-mentioned object can be attained by a photo-curable transfer sheet having a photo-curable transfer layer comprising a photo-curable composition deformable by application of pressure,
wherein the photo-curable composition comprises a polymer having a glass transition temperature of not less than 80° C. and a reactive diluent having a photopolymerizable functional group.

The preferred embodiments of the photo-curable transfer sheet according to the present invention are as follows:

1) The photo-curable composition has a glass transition temperature of less than 20° C. Excellent transferring property can be obtained.

2) The photo-curable transfer layer has an initial stress before being subjected to ultraviolet exposure and a relaxation time required for the initial stress to change 1/e thereof, the initial stress being not more than 600 Pa, the relaxation time being not more than 0.10 seconds, and the initial stress and the relaxation time being obtained by creep recovery measurement. In this case, the photo-curable transfer layer having been subjected to ultraviolet exposure of 300 mJ/cm² generally has a glass transition temperature of not less than 65° C.

The photo-curable transfer layer having the specific initial stress and the specific relaxation time shows excellent performance to an accelerating test such as test for resistance to moist heat (especially excellent readout property of signals after the test) and hence is improved in durability. In more detail, accordingly to the study of the inventors, though variation of kinds or amount of the reactive diluent enables the curing of the transfer layer even by ultraviolet exposure for a short time, the cured layer shows large residual strain and therefore the shape of pits of the layer varies with time to reduce accuracy of readout of signals. For instance, in case an optical information recording medium (optical disc) is subjected to an accelerating test such as test for resistance to moist heat (80° C.×85%×240 h), the medium after the test show poor readout of signals. In the invention, such disadvantages are especially resolved.

In further detail, the initial stress and the relaxation time are obtained by subjecting a sample having thickness of 200 μm and diameter of 8 mm to creep recovery measurement by using a parallel plate fixture (jig) under the conditions of measuring temperature of 50° C. and displacement of 10%. In the invention, the measurement is carried out by using Rheo-Stress RS300 as a dynamic viscoelasticity measuring apparatus. The displacement of "displacement of 10%" means the strain (γ: %) defined below.

In more detail, the displacement is represented by the following formula:

$$\gamma(\%) = R\theta/h \times 100 = \theta/\tan\theta \times 100$$

in which R represents radius of a sensor (parallel plate fixture),
θ represents angle in case the sensor is supposed as the shape of corn, and
h represents a gap (thickness of sample).

The "displacement of 10%" means that γ is 10%.
The relationship between R, h and θ is shown in FIG. 7.
In the invention, the relationship between the initial stress $S_0$ and the relaxation time t1 required for the initial stress $S_0$ to change $S_0/e$ is shown in FIG. 6. A strain is applied to the transfer layer under the above-mentioned conditions, and the initial stress $S_0$ corresponding to the strain occurs, and the change of the initial stress $S_0$ after removal of the strain is shown.

3) The photo-curable transfer layer having been subjected to ultraviolet exposure for t2 time period (second) has residual stress (S) of not more than 500 Pa, the residual stress being represented by the following formula:

$$S = S_0 \times e^{-t2/t1}$$

in which $S_0$ represents the initial stress (Pa) of the photo-curable transfer layer before being subjected to ultraviolet exposure, and t1 represents the relaxation time required for the initial stress to change 1/e thereof.

The exposure time t2 for obtaining the residual stress (S) is determined in the following manner.

The same sample as used in the measurement of the initial stress and relaxation time is allowed to stand at 23° C. for 48 hours, and thereafter the sample is exposed to ultraviolet rays until its hardness attains a defined hardness (generally 80N/mm which is measured by a micro hardness tester available from Fisher Instrument). The exposure time t2 required for the sample to attain the defined hardness is determined and, by using the value of t2, the remain stress S is determined by the above formula.

Hence, the exposure time t2 means time required for the hardness of the sample to attain 80N/mm through UV exposure. In the photo-curable transfer sheet, the photo-curable transfer layer cured as above has a glass transition temperature of not less than 65° C., whereby the shape of the resultant pits can be stabilized. Also, by maintaining the hardness, the shape of the resultant pits can be further stabilized.

The relaxation time generally is in the range of 0.5 to 8 seconds.

4) The polymer having a glass transition temperature of not less than 80° C. is acrylic resin.

5) The acrylic resin has at least 50% by weight of recurring unit of methyl methacrylate. An appropriate combination of the acrylic resin with the reactive diluent brings about both excellent transferring property and curing property.

6) The acrylic resin has a photopolymerizable functional group.

7) The acrylic resin is a copolymer of methyl methacrylate, at least one alkyl (meth)acrylate whose alkyl has 2 to 10 carbon atoms and glycidyl (meth)acrylate, the glycidyl group being reacted with carboxylic acid having a photopolymerizable functional group. An appropriate combination of the acrylic resin with the reactive diluent brings about both excellent transferring property and curing property.

8) The acrylic resin is a copolymer of methyl methacrylate, at least one alkyl (meth)acrylate whose alkyl has 2 to 10 carbon atoms and carboxylic acid having a photopolymerizable functional group, a carboxyl group of the carboxylic acid being reacted with glycidyl (meth)acrylate. An appropriate combination of the acrylic resin with the reactive diluent brings about both excellent transferring property and curing property.

9) The acrylic resin has a hydroxyl group.

10) The acrylic resin is a copolymer of methyl methacrylate, at least one alkyl (meth)acrylate whose alkyl has 2 to 10 carbon atoms and at least one hydroxyalkyl (meth)acrylate whose hydroxyalkyl has 2 to 4 carbon atoms. Especially, the acrylic resin has preferably at least 50% by weight of recurring unit of methyl methacrylate. An appropriate combination of the acrylic resin with the reactive diluent brings about both excellent transferring property and curing property.

11) The photo-curable composition further contains polyisocyanate, preferably diisocyanate. Post-crosslinking (after-crosslinking) before light curing can be carried out to enhance shape-maintaining property of a sheet before transferring.

12) The polymer having a glass transition temperature of not less than 80° C. has weight average molecular weight of not less than 100,000. Particularly, weight average molecular weight of 100,000 to 300,000 is preferred. By appropriate combination between this molecular weight, composition of acrylic resin and ratio of reactive diluent as described later, specifically excellent transferring property and curing property can be obtained.

13) The polymer having a glass transition temperature of not less than 80° C. contains 0.1 to 10% by mole of hydroxyl group.

14) The photo-curable composition contains 0.1 to 10% by weight of a photopolymerization initiator.

15) The photo-curable transfer sheet has light transmittance of not less than 70% in the range of wavelengths of 380 to 420 nm.

16) The photo-curable transfer sheet has light transmittance of not less than 70% in the range of wavelengths of 380 to 800 nm.

17) The photo-curable transfer layer has a thickness of 5 to 300 µm.

18) A release sheet is provided on one side or both sides of the photo-curable transfer layer.

19) The photo-curable transfer sheet is in the form of continuous length, and has the approximately same width as the release sheet.

The present invention is provided by a process for the preparation of an optical information recording medium comprising of the steps (2) to (4):

a step (2) of removing the release sheet on one side of the photo-curable transfer sheet as mentioned above, in case the photo-curable transfer sheet has the release sheets on the both sides, a step (3) of placing the photo-curable transfer sheet on an uneven surface of a reflective layer, such that the photo-curable transfer layer is in contact with the uneven surface, the reflective layer being formed on an uneven surface of a substrate having the uneven surface of recorded pits and/or grooves, and depressing the photo-curable transfer sheet and the substrate to form a laminate in which the one side of the photo-curable transfer sheet adheres closely to the uneven surface of the reflective layer, and a step (4) of removing the release sheet on the other side of the photo-curable transfer layer of the laminate.

The preferred embodiments of the process according to the present invention are as follows:

1) Prior to the step (2), the following step (1) is performed:

a step (1) of punching out a disc from the photo-curable transfer sheet, or a step (1) of punching out a disc comprising the photo-curable transfer layer and the release sheet on one side of the photo-curable transfer sheet from the photo-curable transfer sheet without punching out the other side release sheet.

2) After the step (4), the following steps (5) and (6) are performed:

a step (5) of placing an uneven surface of a stamper having the uneven surface of recorded pits and/or grooves on the surface having no release sheet of the laminate, and depressing the photo-curable transfer sheet and the stamper to form a laminate in which the surface of the photo-curable transfer layer adheres closely to the uneven surface of the stamper, and a step (6) of exposing the laminate having the stamper to ultraviolet rays to cure the photo-curable transfer layer, and removing the stamper from the laminate to form an uneven surface on the photo-curable transfer layer.

3) The ultraviolet exposure of the step (6) is carried out in irradiation energy of 300 to 800 mJ/cm$^2$ (especially 300 mJ/cm$^2$). A rapid curing can be carried out.

4) The ultraviolet exposure of the step (6) is carried out for 0.5 to 1.5 second. A rapid curing can be carried out.

5) The photo-curable transfer layer obtained after the step (6) has a glass transition temperature of not less than 65° C.

6) After steps (5) and (6), the following step (7) is performed:

a step (7) of forming a reflective layer on the uneven surface of the photo-curable transfer layer.

Further, the present invention is provided by an optical information recording medium obtainable by the process as mentioned above.

In more detail, the optical information recording medium comprises a substrate having an uneven surface of recorded pits and/or grooves, a reflective layer (including a semi-transparent reflective layer) formed along the uneven surface of the substrate, and a cured layer of a photo-curable composition formed along the uneven surface of the reflective layer, wherein the photo-curable composition is the composition of the above-mentioned photo-curable transfer sheet.

Effect of the Invention

The photo-curable transfer sheet of the invention is advantageous for the preparation of an optical information recording medium (e.g., DVD) having small thickness and high capacity, and an uneven shape of a stamper or a substrate can be easily transferred to the surface of the photo-curable transfer sheet, and simultaneously curing after the transferring can be carried out at high speed. In more detail, the photo-curable transfer sheet of the invention comprises a photocurable composition obtained by combination of the acrylic resin with the reactive diluent whereby both excellent transferring property and curing property can be acquired. Hence, the use of the photo-curable transfer sheet enables the rapid preparation of an optical information recording medium having accuracy.

Particularly, by setting Tg of the photo curable composition to 20° C., or by using the photo curable transfer layer having initial stress of not more than 600 Pa before UV exposure and setting the relaxation time required for the initial stress of the layer to change 1/e thereof to 10 or less seconds, long-term stability of the shape of pits in addition to both excellent transferring property and curing property can be acquired. Hence, an optical information recording medium having high accuracy and excellent durability can be rapidly prepared by using the photo curable transfer sheet.

Further, the photo curable transfer sheet of the invention has the above-mentioned constitution, and therefore, if the transfer sheet is used in the form of a roll of its continuous sheet, the roll is free from exudation of the integrant of the photo-curable transfer layer and from the fluctuation of the thickness, and hence especially shows excellent workability. Particularly in case the transfer layer contains diisocyanate, the above-mentioned effect can be easily obtained due to its post-curing.

| Explanation of reference numbers | |
|---|---|
| 11: | Photo-curable transfer layer |
| 12a, 12b: | Release sheet |
| 21: | Substrate |
| 23 | Semitransparent reflective layer |
| 24: | Stamper |
| 25 | Reflective layer |
| 26: | Organic polymer film (cover layer) |

DETAILED DESCRIPTION OF THE INVENTION

Embodiments of the invention are explained in detail by referring to drawings.

Figure 1:
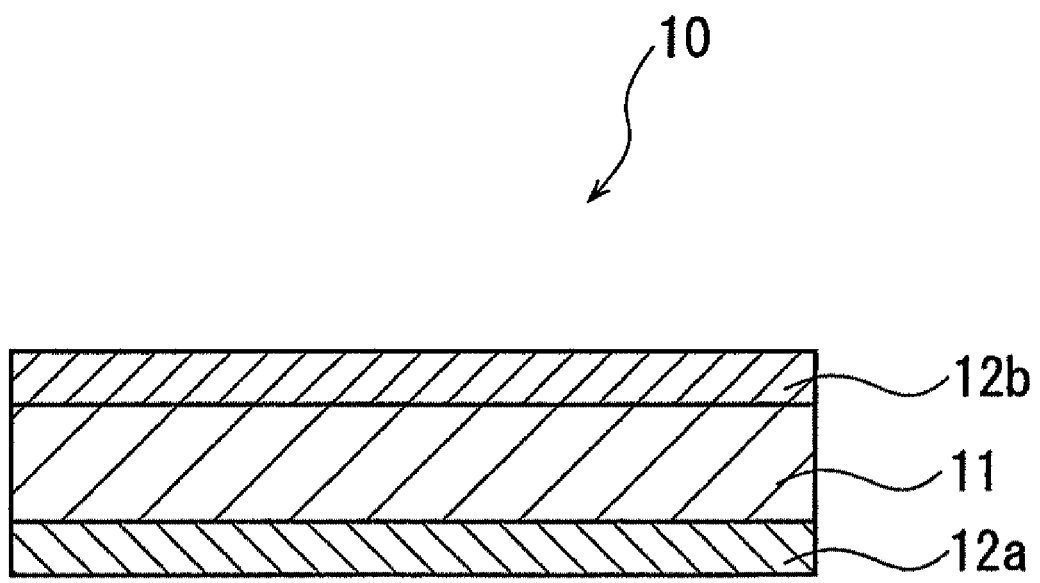
FIG. 1 is a section view showing an example of an embodiment of the photo-curable transfer sheet of the present invention.

FIG. 1 is a section view showing an example of an embodiment of the photo-curable transfer sheet 10 of the present invention. A photo-curable transfer layer 11 has a release sheet 12a, 12b on both sides of the layer 11. The release sheet 12a, 12b may be provided on one side of the layer 11. Otherwise the release sheet 12a, 12b may be not provided. The provision way of the release sheet can be selected depending upon the uses.

The photo-curable transfer layer 11 is easily deformable by application of pressure such that unevenness of a stamper can be precisely transferred to the layer by depressing the stamper and the layer, and at the same time has excellent curing property. In more detail, the photo-curable transfer sheet 11 comprises an acrylic resin having glass transition temperature of not less than 80° C. and the reactive diluent (polymerizable monomer) having a photopolymerizable functional group and preferably has a glass transition temperature of less than 20° C., whereby an uneven shape of a stamper or substrate can be easily transferred to the transfer layer and subsequent curing can be carried out at high speed. Further, the cured layer has high Tg and therefore the uneven shape of the layer can be maintained for long term.

In the preferred embodiment, the photo-curable transfer layer 11 comprises a photo curable composition comprising an acrylic resin having glass transition temperature of not less than 80° C. and the reactive diluent having a photopolymerizable functional group, and simultaneously has an initial stress before being subjected to ultraviolet exposure and a relaxation time required for the initial stress to change 1/e thereof, the initial stress being not more than 600 Pa, the relaxation time being not more than 10 seconds (preferably 0.5 to 8 seconds). Further, the photo-curable transfer layer having been subjected to ultraviolet exposure of 300 mJ/cm² preferably has a glass transition temperature of not less than 65° C. Thereby, an uneven shape of a stamper or substrate can be easily transferred to the transfer layer and subsequent curing can be carried out at high speed as mentioned above, and further the cured layer having the shape of pits has reduced residual stress and high Tg to show performance including no variation of the shape of pits, especially long-term stability of the shape, and hence excellent durability.

In further detail, the initial stress and the relaxation time of the photo-curable transfer layer before UV exposure are obtained by subjecting a sample having thickness of 200 μm and diameter of 8 mm to creep recovery measurement by using a parallel plate fixture (jig) under the conditions of measuring temperature of 50° C. and displacement of 10%.

Further the photo-curable transfer layer having been subjected to ultraviolet exposure for t2 time period (second) preferably has residual stress (S) of not more than 500 Pa, the residual stress (S) being represented by the following formula:

$$S = S_0 \times e^{-t2/t1}$$

in which $S_0$ represents the initial stress (Pa) of the photo-curable transfer layer before being subjected to ultraviolet exposure, and t1 represents the relaxation time required for the initial stress to change 1/e thereof. Thereby, the cured transfer layer has reduced residual stress to acquire excellent durability including little variation of the shape of pits and the like with time, whereby the photo curable transfer sheet having excellent durability can be obtained.

The exposure time t2 for obtaining the residual stress (S) is determined in the following manner.

The same sample as used in the measurement of the initial stress and relaxation time is allowed to stand at 23° C. for 48 hours, and thereafter the sample is exposed to ultraviolet rays until its hardness attains a defined hardness (generally 80N/mm which is measured by a micro hardness tester available from Fisher Instrument). By using the value of t2, the remain stress S is determined by the above formula.

The exposure time t2 means an exposure time required for the sample to attain the defined hardness of 80N/mm by UV exposure. In the photo-curable transfer sheet, the photo-curable transfer layer cured as above has a glass transition temperature of not less than 65° C., whereby the shape of the resultant pits can be stabilized. Also, by maintaining the hardness, the shape of the resultant pits can be further stabilized.

The polymer having glass transition temperature (Tg) of not less than 80° C. preferably has a photopolymerizable functional group because it can be reacted with the reactive diluent to enhance the curing rate. The polymer preferably has hydroxyl group because the transfer layer can be a little cured by use of diisocyanate whereby exudation of the integrant of the layer and variation of the thickness are greatly repressed. The use of the diisocyanate is effective to some extent even if the polymer has no hydroxy group.

In the photo-curable transfer sheet, the photo-curable transfer layer preferably has a light transmittance of not less than 70% in a wavelength rang of 380 to 420 nm so as to easily read out information from the uneven surface of the sheet with a reading laser beam for the purpose of density growth of information. The light transmittance in a wavelength rang of 380 to 420 nm is especially preferred not less than 80%. Thus, the optical information recording medium of the invention prepared by using the photo-curable transfer layer is advantageously used in a method of reading out information from pit signals using a laser beam of wavelength of 380 to 420 nm.

Figure 2:
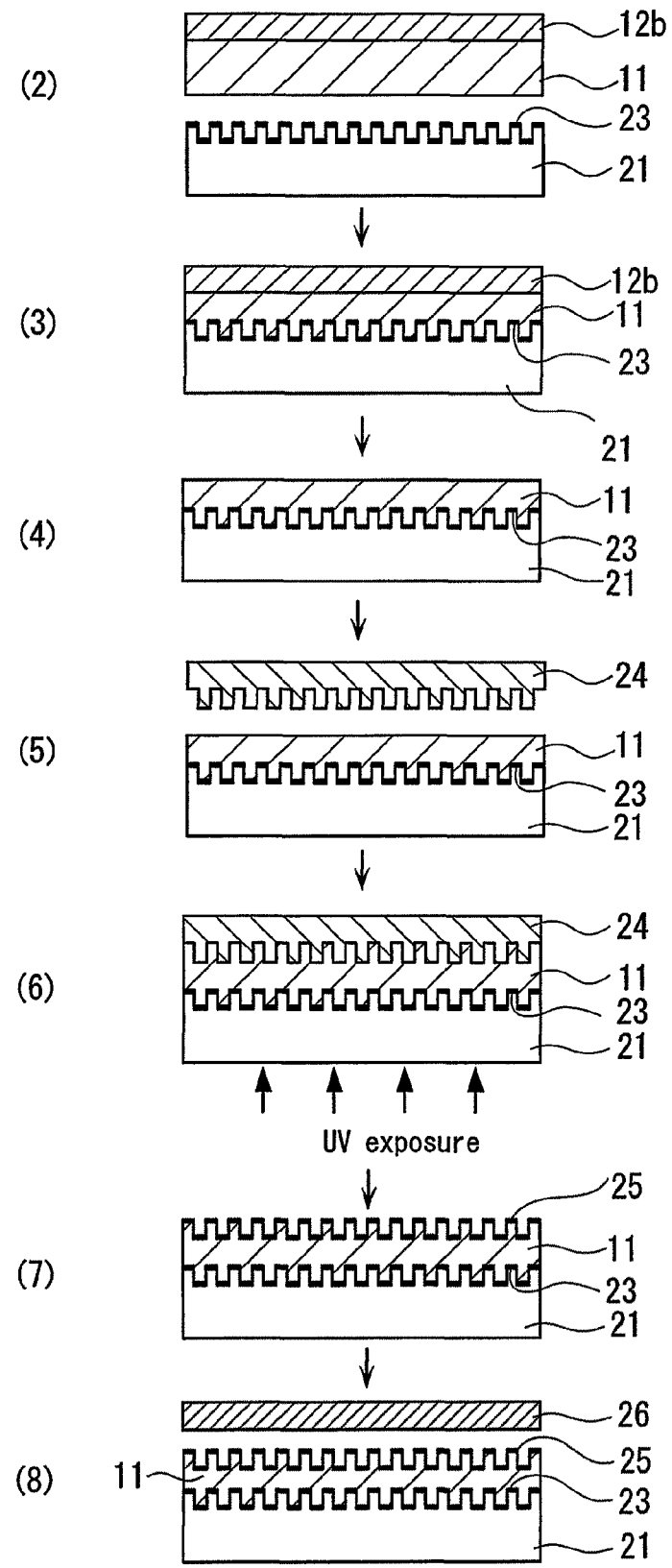
FIG. 2 is a section view showing an example of a process for preparing the optical information recording medium of the present invention.

The optical information recording medium can be prepared using the above photo-curable transfer sheet 10, for example, as shown in FIG. 2.

A disc (generally doughnut shape) is punched out from the photo-curable transfer sheet 10 (step 1). In this case, there are two methods for punching out; i.e., a method of punching out a disc comprising the photo-curable transfer layer 11 and the both sides release sheets 12a and 12b from the photo-curable transfer sheet, and a method of punching out a disc comprising the photo-curable transfer layer 11 and the one side release sheet 12b from the photo-curable transfer sheet without punching out the other side release sheet 12a. The former is generally referred to as full edge and the latter as dry edge, and these are expediently selected. Such punching process can be performed by using the photo-curable transfer sheet 10 without occurrence of exudation or protrusion of the transfer layer and with good workability.

Subsequently, the release sheet 12a is removed from the photo-curable transfer sheet 10, and the photo-curable transfer layer 11 provided with the release sheet 12b is prepared (step 2). The photo-curable transfer sheet 10 is depressed on an uneven surface of a half-transparent reflective layer 23, the reflective layer 23 being formed on an uneven surface of a substrate 21 having the uneven surface of recorded pits, such that the surface having no release layer of the photo-curable transfer layer 11 faces the uneven surface of the reflective layer 23 (step 3). The half-transparent reflective layer 23 generally is a reflective layer having relatively low reflectivity and comprising AgX, etc. Hence, a laminate in which the one side of the photo-curable transfer sheet 10 adheres closely to the uneven surface of the reflective layer 23 is formed, the laminate comprising the photo-curable transfer layer 11, reflective layer 23 and substrate 21. In case this structure (laminate) is used as an optical disc, the photo-curable transfer layer 11 is exposed to UV (ultraviolet ray) to be cured, and then the release sheet 12b is removed from the laminate.

Subsequently, the release sheet 12b is removed from the laminate (step 4), and an uneven surface of a stamper 24 having the uneven surface of recorded pits is placed on the uncured surface (i.e., a surface in noncontact with the substrate) of the photo-curable transfer layer 11 of the laminate to depress the photo-curable transfer sheet and the stamper 24 (step 5). Thus a laminate (comprising 21, 23, 11, 24) in which the surface of the photo-curable transfer sheet 10 adheres closely to the uneven surface of the stamper 24 is formed, and the photo-curable transfer layer 11 of the laminate is exposed to ultraviolet rays to be cured (generally 300 or more mJ/cm$^2$) (step 6), and then the stamper 24 is removed from the laminate to form an uneven surface on the cured photo-curable transfer layer. Hence, a laminate (optical information recording medium) comprising the substrate 21, the reflective layer 23 and the cured photo-curable transfer layer 11 is obtained.

Figure 3:
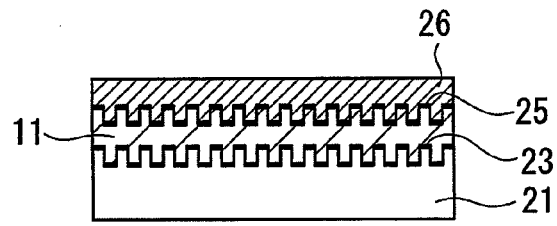
FIG. 3 is a section view showing an example of the optical information recording medium of the present invention.

Generally, on the uneven surface of the cured photo-curable transfer layer 11, a reflective layer (generally a high reflective layer comprising Al or the like) 25 is formed (step 7). Further, an organic polymer film (cover layer) 26 is bonded onto the reflective layer 25 through an adhesive layer (step 8). Hence, an optical information recording medium as shown in FIG. 3 is obtained. A photo-curable transfer sheet 10 may be further depressed on the uneven surface of the reflective layer and cured by ultraviolet rays (generally 300 or more mJ/cm$^2$). Otherwise, an ultraviolet curable resin may be applied onto the uneven surface of the reflective layer and cured by ultraviolet rays. The half-transparent reflective layer may be an ordinary reflective layer such as Al (for disc readable from double sides). Further, the reflective layer 23 may be changed from a half-transparent reflective layer to a high reflective layer, and the reflective layer 25 may be changed from a high reflective layer to a half-transparent reflective layer. Moreover, the stamper may be a substrate having uneven surface.

In the step 7, a half-transparent reflective layer is formed the uneven surface of the cured photo-curable transfer layer instead of the high reflective layer, and by repeating the steps (2) to (7), three or more uneven surfaces (recorded pits) can be formed.

In the above process, the optical information recording medium exclusively used for reproduction is explained. However, an optical information recording medium used for recording (writing) is also prepared in the same manner as the above process. In the recordable medium, for example, grooves, or grooves and pits are provided instead of the pits, and a metal recording layer is provided instead of the reflective or semitransparent reflective layer. When the recording layer is a dye-recording layer or a recording layer having low reflectivity, a recording layer and reflective layer are generally provided. Besides these points, the recordable medium can be also prepared in the same manner as above.

In the invention, the photo-curable transfer sheet 10 is configured such that the uneven shape corresponding to recorded pits of the substrate 21 can be accurately transferred to the photo-curable transfer layer 11 by depressing the layer (sheet) 11 and the substrate 21 at low temperature of 100° C. or less (preferably an ordinary temperature). Superposition of the substrate 21 and the photo-curable transfer layer 11 is generally carried out using a pressure rollers or easy press (preferably under reduced pressure). The photo-curable transfer layer 11 after curing is strongly bonded to the metal used in the reflective layer provided on the substrate 21, and therefore is not peeled from the reflective layer. If necessary, an adhesion promoting layer may be formed on the reflective layer.

In the invention, the photo-curable transfer sheet 10 is configured such that the uneven shape corresponding to recorded pits of the stamper 24 can be accurately transferred to the photo-curable transfer layer 11 by depressing the layer (sheet) 11 and the stamper 24 at low temperature of 100° C. or less (preferably an ordinary temperature). Superposition of stamper 24 and the photo-curable transfer layer 11 is generally carried out using a pressure rollers or easy press (preferably under reduced pressure). The photo-curable transfer layer 11 after curing generally has Tg of 65 or more ° C. and is extremely weakly stuck to metal such as nickel used in the stamper 24, and therefore the photo-curable transfer layer 11 can be easily peeled from the stamper 24.

The substrate 21 generally is s thick plate (generally a thickness of 0.3 to 1.5 mm, especially approx. 1.1 mm), and therefore generally prepared by a conventional injection molding process. However, the photo-curable transfer layer and stamper are used for preparing the optical information recording medium without the substrate. The photo-curable transfer sheet can be prepared in a small thickness of not more than 300 µm (especially not more than 150 µm), and therefore the thickness of the substrate prepared by the conventional process can be increased to enhance the accuracy of the form of pits.

In the process, when the photo-curable transfer layer is depressed on the substrate, or when the stamper is depressed on the photo-curable transfer layer, it is preferred to carry out the depressing operation under reduced pressure, whereby the deaeration treatment in the operation can be easily carried out.

The depressing operation under the reduced pressure can be performed by a method comprising passing a photo-curable transfer sheet and a stamper between two rolls under reduced pressure; or by a method comprising placing a stamper in a mold of a vacuum molding device and bringing a photo-curable adhesive sheet into contact with the stamper under reduced pressure to depress them.

Figure 4:
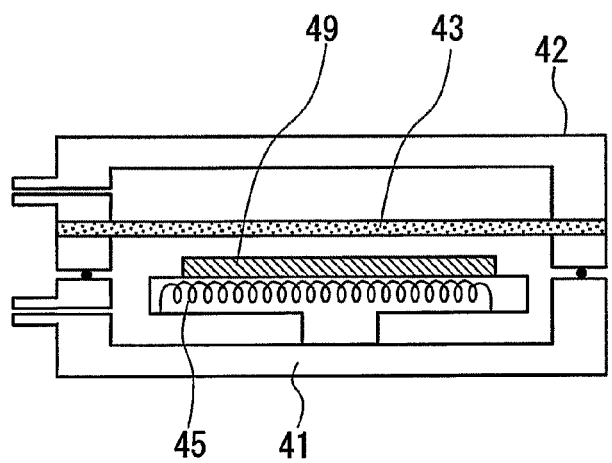
FIG. 4 is a schematic view for explaining a depressing method using a device according to a double vacuum chamber system.

Further, the depressing operation under the reduced pressure can be performed using a device according to a double vacuum chamber system. The operation is explained by referring to FIG. 4. FIG. 4 shows an example of a laminator according to a double vacuum chamber system. The laminator is provided with a lower chamber 41, an upper chamber 42, a sheet of silicone rubber 43 and a heater 45. A laminate 49 consisting of a substrate having an uneven surface and a photo-curable transfer sheet provided thereon or consisting of a substrate, transfer sheet and stamper is placed in the lower chamber 41 of the laminator. Both the upper chamber 42 and lower chamber 41 are degassed or decompressed. The laminate 49 is heated with a heater 45, and air is introduced into the upper chamber 42 to allow the chamber to be at atmospheric pressure while the lower chamber 54 is kept under reduced pressure, whereby the laminate is depressed to be contact bonded. After cooling, the laminate is taken out and trans-formed to the next step. This operation permits sufficient deaeration under reduced pressure, and therefore, the stamper or substrate and the photo-curable transfer sheet can be contact bonded without bubbles.

The photo-curable transfer sheet used in the present invention has the photo-curable transfer layer composed mainly of a photo-curable composition deformable by application of pressure which includes a polymer having a glass transition temperature of not more than 80° C. and a reactive diluent having a photopolymerizable functional group (polymerizable monomer or oligomer).

The preferred photo-curable transfer sheet has a photo-curable transfer layer comprising a photo-curable composition which includes a polymer having a glass transition temperature of not more than 80° C. and a reactive diluent having a photopolymerizable functional group (polymerizable monomer or oligomer) and which has a glass transition temperature of less than 20° C. Alternatively, the preferred photo-curable transfer sheet has a photo-curable transfer layer comprising a photo-curable composition which includes a polymer having a glass transition temperature of not more than 80° C. and a reactive diluent having a photopolymerizable functional group (polymerizable monomer or oligomer), and having an initial stress before being subjected to ultraviolet exposure and a relaxation time required for the initial stress to change 1/e thereof, the initial stress being not more than 600 Pa, the relaxation time being not more than 10 seconds (preferably 0.5 to 8 seconds), and further preferably the photo-curable transfer layer having been subjected to ultraviolet exposure of 300 mJ/cm$^2$ generally has a glass transition temperature of not less than 65° C.

The photo-curable composition is generally composed mainly of the polymer having a glass transition temperature of not less than 80° C. and a reactive diluent (generally monomer or oligomer) having a photopolymerizable functional group (generally carbon-carbon double bond, preferably (meth)acryloyl group), a photopolymerization initiator and if necessary other additives.

Examples of the polymer having glass transition temperature of not less than 80° C. include acrylic resin, polyvinyl acetate, vinyl acetate/(meth)acrylate copolymer, ethylene/vinyl acetate copolymer, polystyrene and copolymer thereof, polyvinyl chloride and copolymer thereof, butadiene/acrylonitrile copolymer, acrylonitrile/butadiene/styrene copolymer, methacrylate/acrylonitrile/butadiene/styrene copolymer, 2-chlorobutasiene-1,3-polymer, chlorinated rubber, styrene/butadiene/styrene copolymer, styrene/isoprene/styrene block copolymer, epoxy resin, polyamide, polyester, polyurethane, cellulose ester, cellulose ether, polycarbonate, polyvinyl acetal.

In the invention, the polymer preferably is acrylic resin in view of excellent transferring property and high curing property. Especially preferred is acrylic resin having a polymerizable functional group or acrylic resin having a hydroxyl group as mentioned above. The acrylic resin preferably has a recurring unit of methyl methacrylate in the amount of not less than 50% by weight, especially 60 to 90% by weight, because the glass transition temperature of not less than 80° C. are easily obtained and excellent transferring property and high curing property are also easily obtained.

The acrylic resin having a polymerizable functional group generally is a copolymer of methyl methacrylate, at least one alkyl (meth)acrylate whose alkyl has 2 to 10 carbon atoms and glycidyl (meth)acrylate, the glycidyl group being reacted with carboxylic acid having a photopolymerizable functional group; or a copolymer of methyl methacrylate, at least one alkyl (meth)acrylate whose alkyl has 2 to 10 carbon atoms and carboxylic acid having a photopolymerizable functional group, a carboxyl group of the carboxylic acid being reacted with glycidyl (meth)acrylate.

The copolymer of methyl methacrylate, at least one alkyl (meth)acrylate whose alkyl has 2 to 10 carbon atoms and carboxylic acid having a photopolymerizable functional group, preferably has at least 50% by weight of recurring unit of methyl methacrylate, especially 60 to 90% by weight of recurring unit of methyl methacrylate. An appropriate combination of the acrylic resin with the reactive diluent enables the achievement of both of excellent transferring property and high curing property. Examples of the alkyl (meth)acrylate whose alkyl has 2 to 10 carbon atoms (especially 3 to 5 carbon atoms) include ethyl (meth)acrylate, n-propyl (meth)acrylate, isopropyl (meth)acrylate, n-butyl (meth)acrylate, isobutyl (meth)acrylate, 2-ethylhexyl (meth)acrylate. Preferred are n-butyl (meth)acrylate, isobutyl (meth)acrylate, 2-ethylhexyl (meth)acrylate. The alkyl (meth)acrylate is preferably contained as recurring unit in the amount of 5 to 30% by weight, especially 10 to 30% by weight, in the polymer. The glycidyl (meth)acrylate or carboxylic acid having a photopolymerizable functional group is preferably contained as recurring unit in the amount of 5 to 25% by weight, especially 5 to 20% by weight, in the polymer. The glycidyl group or carboxyl group of the resultant copolymer is reacted with carboxylic acid having a photopolymerizable functional group or glycidyl (meth)acrylate, respectively.

The copolymer having hydroxyl group generally is a copolymer of methyl methacrylate, at least one alkyl (meth) acrylate whose alkyl has 2 to 10 carbon atoms (especially 3 to 5 carbon atoms) and at least one hydroxyalkyl (meth)acrylate whose hydroxyalkyl has 2 to 4 carbon atoms. The methyl methacrylate is preferably contained as recurring unit in the amount of at least 50% by weight, especially 60 to 90% by weight in the polymer. An appropriate combination of the acrylic resin with the reactive diluent enables the achievement of both of excellent transferring property and high curing property. Examples of the alkyl (meth)acrylate whose alkyl has 2 to 10 carbon atoms (especially 3 to 5 carbon atoms) include ethyl (meth)acrylate, n-propyl (meth)acrylate, isopropyl (meth)acrylate, n-butyl (meth)acrylate, isobutyl (meth)acrylate, 2-ethylhexyl (meth)acrylate. Preferred are n-butyl (meth)acrylate, isobutyl (meth)acrylate, 2-ethylhexyl (meth)acrylate. The alkyl (meth)acrylate is preferably contained as recurring unit in the amount of 5 to 30% by weight, especially 10 to 30% by weight, in the polymer. Examples of the hydroxyalkyl (meth)acrylate whose hydroxyalkyl has 2 to 4 carbon atoms include 2-hydroxyethyl methacrylate, hydroxypropyl methacrylate. The hydroxyalkyl (meth)acrylate is preferably contained as recurring unit in the amount of 5 to 25% by weight, especially 5 to 20% by weight, in the polymer.

The acrylic resin having a polymerizable functional group is, for example, prepared as follows:

One or plural (meth)acrylate(s) (preferably methyl methacrylate and at least one alkyl (meth)acrylate whose alkyl has 2 to 10 carbon atoms as mentioned above) is reacted with a compound having a glycidyl group and a photopolymerizable functional group (preferably glycidyl (meth)acrylate), or with a carboxylic acid having a photopolymerizable functional group in the presence of a radical polymerization initiator and an organic solvent according to a known polymerization process such as a solution polymerization process, whereby glycidyl group-containing acrylic resin (a) or carboxyl group-containing acrylic resin (b) is obtained. The alkyl (meth)acrylate is preferably contained in the amount of 10 to 45% by weight in terms of solid based on the glycidyl group-containing acrylic resin (a) or carboxyl group-containing acrylic resin (b).

Subsequently, carboxylic acid having a photopolymerizable functional group is added to the glycidyl group-containing acrylic resin (a), or a compound having a glycidyl group and a photopolymerizable functional group (preferably glycidyl (meth)acrylate) is added to the carboxyl group-containing acrylic resin (b), with if necessary heating to prepare an acrylic photocurable resin (A) or an acrylic photocurable resin (B). A molar ratio of carboxyl group to glycidyl group is generally 1/0.9 to 1/1, preferably 1/1. Excess glycidyl group may bring about disadvantages in long-term stability such as increase of viscosity or gelation, whereas excess carboxyl group reduces workability due to increase of skin irritation. Further, the ratio of 1/1 brings about disappearance of glycidyl group to extremely enhance storage stability. The reaction can be carried out according to known methods in the presence of base catalyst or phosphorous catalyst.

The (meth)acrylate monomers as chief ingredient of the acrylic resin used in the invention, the acrylic resin including the acrylic resin having a photopolymerizable functional group or hydroxyl group, include esters of acrylic acid or methacrylic acid. Examples of the esters of acrylic acid or methacrylic acid include alkyl(meth)acrylates such as methyl (meth)acrylate [the (meth)acrylate means acrylate and methacrylate, hereinafter in the same manner], ethyl (meth)acrylate, n-propyl (meth)acrylate, n-butyl (meth)acrylate, isobutyl (meth)acrylate, t-butyl (meth)acrylate, 2-ethylhexyl (meth)acrylate, stearyl (meth)acrylate, lauryl (meth)acrylate and tridecyl (meth)acrylate; alkoxyalkyl(meth)acrylates such as ethoxyethyl(meth)acrylate and butoxyethyl(meth)acrylate; alkoxyalkoxyalkyl(meth)acrylates such as 2-methoxyethoxyethyl(meth)acrylate and 2-ethoxyethoxyethyl (meth) acrylate; alkoxy (poly)alkylene glycol (meth)acrylates such as methoxy diethylene glycol (meth)acrylate, ethoxy diethylene glycol (meth)acrylate, methoxy triethylene glycol (meth)acrylate, butoxy triethylene glycol (meth)acrylate and methoxy dipropylene glycol (meth)acrylate; dialkylaminoalkyl(meth)acrylates such as pyrenoxide adduct (meth) acrylates, N,N-dimethylaminoethyl (meth)acrylate and N,N-diethylaminoethyl (meth)acrylate. Further there can be mentioned aromatic compounds having unsaturated group (e.g., styrene).

In the invention, it is preferred to use methyl methacrylate and at least one alkyl (meth)acrylate whose alkyl has 2 to 10 carbon atoms.

The compound having a glycidyl group and a photopolymerizable functional group (preferably glycidyl (meth)acrylate) generally is a compound represented by the following formula:

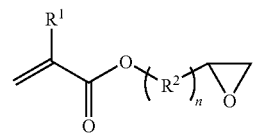

in which $R^1$ represents H or $CH_3$, $R^2$ represents —$CH_2$— or —$CH_2$—O—, and n is an integer of 1 to 5.

Examples of the carboxylic acid having a photopolymerizable functional group include acrylic acid, methacrylic acid, co-carboxy-polycaprolacton (n≈2) monoacrylate (Aronix M-5300, available from Toagosei Co., Ltd.), phthalic acid monohydroxyethyl acrylate (Aronix M-5400, available from Toagosei Co., Ltd.), acrylic acid dimmer monoacrylate (Aronix M-5600, available from Toagosei Co., Ltd.).

The acrylic resin having a hydroxyl group can be also, for example, prepared basically in the same manner as the radical polymerization of the above-mentioned acrylic resin having a polymerizable functional group before the combination with the polymerizable functional group. In the case, in addition to the above-mentioned (meth)acrylate monomer, (meth)acrylate having hydroxy group (preferably at least one hydroxyalkyl (meth)acrylate whose hydroxyalkyl has 2 to 4 carbon atoms) is used, and these monomers are copolymerized with each other.

In the invention, preferred is at leas one copolymer obtained by copolymerizing methyl methacrylate and at least one alkyl (meth)acrylate whose alkyl has 2 to 10 carbon atoms (especially 3 to 5 carbon atoms) and at least one hydroxyalkyl (meth)acrylate whose hydroxyalkyl has 2 to 4 carbon atoms with each other. The acrylic resin having hydroxyl group preferably contains 0.1 to 10% by mole, especially 0.5 to 5% by mole of hydroxyl group. The use of diisocyanate easily gives appropriate curing to the transfer layer to prevent exudation of the integrant of the layer.

The polymer having a glass transition temperature of not less than 80° C., preferably has number average molecular weight of not less than 100,000, especially 100,000 to 300,000, and weight average molecular weight of not less than 100,000, especially 100,000 to 300,000.

As the polymer having a glass transition temperature of not less than 80° C. the invention, acrylic resin having both of a photopolymerizable functional group and an active hydrogen containing functional group such as a hydroxyl group can be also used. Such reactive polymer generally is a homopolymer or copolymer (i.e., acrylic resin) which is obtained from the above-mentioned (meth)acrylates and which has a photopolymerizable functional group and a functional group having active hydrogen in its main chain or side chain. Hence the homopolymer or copolymer can be obtained, for example, by copolymerizing methyl methacrylate, one or more (meth)acrylate mentioned above with (meth)acrylate (e.g., 2-hydroxyethyl (meth)acrylate) having a functional group such as a hydroxyl group, and reacting the resultant polymer with a compound (e.g., isocyanatoalkyl (meth)acrylate) having a functional group capable of reacting with the active hydrogen-containing group of the polymer and having a photopolymerizable functional group. In the latter reaction, the amount of the compound (e.g., isocyanatoalkyl (meth)acrylate) having a functional group capable of reacting with the hydroxyl group is adjusted so as to leave the hydroxyl group. Thus, the polymer having the photopolymerizable functional group and the hydroxyl group as the active hydrogen-containing group can be obtained.

Otherwise, the use of (meth)acrylate (e.g., 2-aminoethyl (meth)acrylate) having an amino group instead of the hydroxyl group in the reaction results in a polymer having the photopolymerizable functional group and the amino group as the active hydrogen-containing group. Similarly a polymer having the photopolymerizable functional group and a carboxyl group as the active hydrogen-containing group can be obtained.

In the invention, it is also preferred to use acrylic resin having a photopolymerizable group through urethane bond.

The polymer having both of a photopolymerizable functional group and an active hydrogen-containing group such as hydroxyl group has generally 1 to 50% by mole, preferably 5 to 30% by mole of the photopolymerizable functional group. Examples of the photopolymerizable functional group preferably include acryloyl, methacryloyl and vinyl groups, especially acryloyl and methacryloyl groups.

Examples of diisocyanate usable in the photo-curable composition of the invention include tolylene diisocyanate (TDI), isophorone diisocyanate, xylylene diisocyanate, diphenylmethane-4,4'-diisocyanate, dicyclopentyl diisocyanate, hexamethylene diisocyanate, 2,4,4'-trimethylhexamethylene diisocyanate, 2,2',4-trimethylhexamethylene diisocyanate. Further three or more functional isocyanate compounds such as TDI adduct of trimethylol propane and hexamethylene diisocyanate adduct of trimethylol propane can be employed. Of these compounds, hexamethylene diisocyanate adduct of trimethylol propane is preferred.

The diisocyanate is preferably contained in the amount of 0.2 to 4% by weight, especially 0.2 to 2% by weight in the photo-curable composition, which results in appropriate crosslinking of the transfer layer to prevent the transfer layer from exudation with maintaining good transfer property between the transfer layer and the uneven surface of substrate or stamper. The reaction of the diisocyanate with the polymer gradually progresses after the provision of the transfer layer, for example, progresses to a large degree at a room temperature (generally 25° C.) for 24 hours. Also it is considered that the polymer and diisocyanate in a coating solution for forming the transfer layer are slightly reacted with each other during the term from its preparation to its coating. Because it is preferred that the transfer layer is cured to some degree between the provision of the transfer layer and the rolling up of the resultant transfer layer, the curing of transfer layer may be promoted by heating during or after of the provision of the transfer layer, or before the rolling up.

As mentioned above, the photo-curable composition is generally composed mainly of the polymer having a glass transition temperature of not less than 80° C. and a reactive diluent (generally monomer and oligomer) having a photopolymerizable functional group (preferably (meth)acryloyl group), a photopolymerization initiator and if necessary other additives.

The photo-curable transfer layer of the invention generally has a glass transition temperature of less than 20° C. Thereby, in case the resultant photo-curable layer is depressed to an uneven surface of a stamper, the photo-curable layer follows accurately the uneven surface even at room temperature to have good flexibility. The photo-curable transfer layer especially has a glass transition temperature of 15 to −50° C., especially 15 to −10° C. whereby the resultant photo-curable layer follows more accurately the uneven surface. When the glass transition temperature exceeds the upper limit, increased pressure and temperature are needed in the depressing and bonding steps of the sheet, which brings about lowering of workability. When the glass transition temperature falls to below the lower limit, the resultant cured sheet does not have sufficient hardness.

The photo-curable transfer layer of the invention has an initial stress before being subjected to ultraviolet exposure and a relaxation time required for the initial stress to change 1/e thereof, the initial stress being not more than 600 Pa, the relaxation time being not more than 10 seconds (preferably 0.5 to 8 seconds). Thereby, accurate and rapid transferring of the uneven shape to the transfer layer is possible.

Further, the photo-curable transfer layer comprising the photo-curable composition is preferably configured such that the layer having been subjected to ultraviolet exposure of 300 mJ/cm$^2$ has a glass transition temperature of not less than 65° C. The brief exposure easily prevents sagging of pit shape, which is apt to occur due to residual stress generated in transferring, whereby the transferred shape of pits and the like can be maintained.

The photo-curable transfer layer comprising the photo-curable composition can be advantageously obtained by using the above-mentioned polymer and the reactive diluent below.

Examples of the reactive diluent having a photopolymerizable functional group, which is a structural requirement of the invention, include, (meth)acrylate monomers such as 2-hydroxyethyl (meth)acrylate, 2-hydroxyropyl (meth)acrylate, 4-hydroxybutyl (meth)acrylate, 2-ethylhexylpolyethoxy (meth)acrylate, benzyl (meth)acrylate, isobornyl (meth)acrylate, phenyloxyethyl (meth)acrylate, tricyclodecane mono(meth)acrylate, dicyclopentenyloxyethyl (meth)acrylate, tetrahydrofurfuryl (meth)acrylate, acryloylmorpholine, N-vinylcaprolactam, 2-hydroxyropyl-3-phenyloxypropyl (meth)acrylate, o-phenylphenyloxyethyl (meth)acrylate, neopentylglycol di(meth)acrylate, neopentyl glycol dipropoxy di(meth)acrylate, neopentyl glycol hydroxypivalate di(meth)acrylate, tricyclodecanedimethylol di(meth)acrylate, 1,6-hexanediol di(meth)acrylate, nonanediol di(meth)acrylate, trimethylolpropane tri(meth)acrylate, pentaerythritol tri(meth)acrylate, pentaerythritol tetra(meth)acrylate, tris[(meth)acryloxyethyl] isocyanurate and ditrimethylolpropane tetra(meth)acrylate; and the following (meth)acrylate oligomer such as:

polyurethane (meth)acrylate such as compounds obtained by reaction of:

a polyol compound (e.g., polyol such as ethylene glycol, propylene glycol, neopentyl glycol, 1,6-hexanediol, 3-methyl-1,5-pentanediol, 1,9-nonanediol, 2-ethyl-2-butyl-1,3-propanediol, trimethylolpropane, diethylene glycol, dipropylene glycol, polypropylene glycol, 1,4-dimethylolcyclohexane, bisphenol-A polyethoxydiol and polytetramethylene glycol; polyesterpolyol obtained by reaction of the above-mentioned polyol and polybasic acid or anhydride thereof such as succinic acid, maleic acid, itaconic acid, adipic acid, hydrogenated dimer acid, phthalic acid, isophthalic acid and terephthalic acid; polycaprolactone polyol obtained by reaction of the above-mentioned polyol and ε-caprolactone; a compound obtained by reaction of a reaction product of the above-mentioned polyol and the above-mentioned polybasic acid or anhydride thereof and ε-caprolactone; polycarbonate polyol; or polymer polyol), and an organic polyisocyanate compound (e.g., tolylene diisocyanate, isophorone diisocyanate, xylylene diisocyanate, diphenylmethane-4,4'-diisocyanate, dicyclopentanyl diisocyanate, hexamethylene diisocyanate, 2,4,4'-trimethylhexamethylene diisocyanate, 2,2',4'-trimethylhexamethylene diisocyanate), and hydroxyl-containing (meth)acrylate (e.g., 2-hydroxyethyl (meth)acrylate, 2-hydroxyropyl (meth)acrylate, 4-hydroxybutyl (meth)acrylate, 2-hydroxy-3-phenyloxypropyl (meth)acrylate, cyclohexane-1,4-dimethylolmono(meth)acrylate, pentaerythritol tri(meth)acrylate or glycerol di(meth)acrylate);

bisphenol-type epoxy(meth)acrylate obtained by reaction of bisphenol-A epoxy resin or bisphenol-F epoxy resin and (meth)acrylic acid.

These compounds having photopolymerizable functional group can be employed singly or in combination of two or more kinds.

Of these compounds, preferred are those having molecular weight of 1,000 or less, more preferably 500 or less, especially 200 to 400. Preferred compounds include tricyclodecanedimethylol di(meth)acrylate, 1,6-hexanediol di(meth)acrylate, nonanediol di(meth)acrylate, and 1,4-butaediol di(meth)acrylate. Especially preferred are acrylates. The reactive diluent is preferably contained in the amount of 20 to 80% by weight (in nonvolatile content), more preferably 30 to 70% by weight, especially 40 to 60% by weight, based on a total amount of the photo-curable composition. A weight ratio of the polymer to the reactive diluent is generally 100: 40-160 (polymer: diluent), preferably 100: 60-140, especially 100: 80-120. Thereby it is easy to change the glass transition temperature of the transfer layer to that of not less than 65° C. after ultraviolet exposure of 300 mJ/cm$^2$ or 500 mJ/cm$^2$.

Any known photopolymerization initiators can be used in the invention. The initiators having good storage-stability after mixing with other integrants are preferred. Examples of the photopolymerization initiators include acetophenone type initiators; benzoin type initiators such as benzylmethylketal; benzophenone type initiators; thioxanthone type initiators such as isopropylthioxanthone and 2,4-diethylhioxanthone. Further, as special type, there can be mentioned methylphenylglyoxylate. Especially preferred are 2-hydroxy-2-methyl-1-phenylpropane-1-on, 1-hydroxycyclohexylphenylketone, 2-methyl-1-[4-(methylthio)phenyl]-2-morphorinopropane-1-on and benzophenone. These photopolymerization initiators can be employed together with one or more kinds of a photopolymerization promoter such as a benzoic acid type compound (e.g., 4-dimethylaminobezoic acid) or a tertiary amine compound by mixing the initiator with the promoter in optional ratio. The initiator can be employed singly or in combination of two or more kinds. The initiator is preferably contained in the photo-curable composition in the range of 0.1 to 20% by weight, especially 1 to 10% by weight.

Of the above-mentioned photopolymerizable initiators, examples of the acetophenone type initiator include 4-phenoxydichloroacetophenone, 4-t-butyldichloroacetophenone, 4-t-butyltrichloroacetophenone, diethoxyacetophenone, 2-hydroxy-2-methyl-1-phenylpropane-1-on, 1-(4-isopropylphenyl)-2-hydroxy-2-methylpropane-1-on, 1-(4-dodecylphenyl)-2-hydroxy-2-methylpropane-1-on, 4-(2-hydroxyethoxy)-phenyl(2-hydroxy-2-propyl)ketone, 1-hydroxycyclohexylphenylketone, 2-methyl-1-[4-(methylthio)phenyl]-2-morphorino-propane-1-on; and examples of the benzophenone type initiator include benzophenone, benzoylbenzoic acid, methyl benzoylbenzoate, 4-phenylbenzophenone, hydroxybenzophenone, 4-benzoyl-4'-methylphenyl sulfide and 3,3'-dimethyl-4-methoxybenzophenone.

The acetophenone type initiators preferably are 2-hydroxy-2-methyl-1-phenylpropane-1-on, 1-hydroxycyclohexylphenylketone and 2-methyl-1-[4-(methylthio)phenyl]-2-morphorinopropane-1-on, and the benzophenone type initiators preferably are benzophenone, benzoylbenzoic acid and methyl benzoylbenzoate.

Preferred examples of the tertiary amine compounds of the photopolymerization promoter include triethanolamine, methyldiethanolamine, triisopropanolamine, 4,4'-dimethylaminobenzophenone, 4,4'-diethylaminobenzophenone, ethyl 2-dimethylaminobenzoate, ethyl 4-dimethylaminobenzoate, (n-butoxy)ethyl 4-dimethylaminobenzoate, isoamyl 4-dimethylaminobenzoate and 2-ethylhexyl4-dimethylaminobenzoate. Especially preferred are ethyl 4-dimethylaminobenzoate, (n-butoxy)ethyl 4-dimethylaminobenzoate, isoamyl 4-dimethylaminobenzoate and 2-ethylhexyl4-dimethylaminobenzoate.

The photo-curable composition is preferably configured such that the photo-curable transfer layer has light transmittance of not less than 70% and a glass transition temperature of less than 20° C. Alternatively, the photo-curable composition is preferably configured such that the photo-curable transfer layer has an initial stress before being subjected to ultraviolet exposure and a relaxation time required for the initial stress to change 1/e thereof, the initial stress being not more than 600 Pa, the relaxation time being not more than 10 seconds (preferably 0.5 to 8 seconds), and the photo-curable transfer layer having been subjected to ultraviolet exposure of 300 mJ/cm$^2$ has a glass transition temperature of not less than 65° C. and further has light transmittance of not less than 70%. Hence, the photo-curable composition preferably contains, in addition to the reactive diluent having a photopolymerizable functional group and the photopolymerization initiator, if desired the following thermoplastic resin and other additives.

As other additives, a silane coupling agent (adhesion promoter) can be used for enhancing adhesive strength (adhesion). Examples of the silane coupling agent include vinyltriethoxysilane, vinyl-tris(β-methoxyethoxy)silane, γ-methacryloxypropylmethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropylmethoxysilane, γ-aminopropyltriethoxysilane, N-β-(aminoethyl)-γ-aminopropyltrimethoxysilane. The silane coupling agent can be used singly, or in combination of two or more kinds. The silane coupling agent is preferably used in the range of 0.01 to 5 weight by part based on 100 parts by weight of the above polymer.

Similarly, an epoxy group-containing compound can be used for enhancing the adhesive strength. Examples of the epoxy group-containing compounds include triglycidyl tris (2-hydroxyethyl)isocyanurate, neopentylglycol diglycidyl ether, 1,6-hexanediol diglycidyl ether, allyl glycidyl ether, 2-ethylhexyl glycidyl ether, phenyl glycidyl ether, phenol glycidyl ether, p-tert-butylphenyl glycidyl ether, diglycidyl adipate, diglycidyl o-phthalate, glycidyl methacrylate and butyl glycidyl ether. Further, the similar effect is also obtained by using an oligomer having an epoxy group and molecular weight of hundreds to thousands, or a polymer having an epoxy group and molecular weight of thousands to hundreds of thousands. The content of the compound having an epoxy group is sufficient in the range of 0.1 to 20 parts by weight based on 100 parts by weight of the reactive polymer. At least one of the compounds having an epoxy group can be used singly or in combination of two or more kinds.

As other additives, further a hydrocarbon resin can be used for improving processing properties such as laminating properties. The hydrocarbon resin may be either natural resin or synthetic resin. Examples of the natural resins preferably include rosins, rosin derivatives and terpene resins. Examples of the rosins include gum resins, tall oil resins, wood resins. Examples of the rosin derivatives include hydrogenated rosins, disproportionated rosins, polymerized rosins, esterificated rosins, metal salts of rosins. Examples of the terpene resins include α-pinene resins, β-pinene resins, and terpene phenol resins. Moreover, as the natural resin, dammar, copal, shellac can be used. Examples of the synthetic resins preferably include petroleum resins, phenol resins, and xylene resins. Examples of the petroleum resins include aliphatic petroleum resins, aromatic petroleum resins, cycloaliphatic petroleum resins, copolymer type petroleum resins, hydrogenated petroleum resins, pure monomer type petroleum resins, and coumarone-indene resins. Examples of the phenol resins include alkylphenol resins and modified phenol resins. Examples of the xylene resins include xylene resins and modified xylene resins.

The hydrocarbon polymer resin can be used in the amount of 1 to 20 parts by weight, preferably 5 to 15 parts by weight based on 100 parts by weight of the polymer of the invention The photo-curable composition may contain, in addition to the above-mentioned additives, an ultraviolet absorber, an aging resistant agent, a dye, and a processing auxiliary agent in a small amount. If desired, particles of silica gel, calcium carbonate or silicone copolymer may be contained in a small amount.

The photo-curable transfer sheet comprising the photo-curable composition of the invention is generally prepared by homogeneously mixing the polymer having Tg of not less than 80° C., the compound diluent having a photopolymerizable functional group (monomer and oligomer) and if desired, the diisocyanate and other additives, kneading the mixture by using an extruder or roll, and subjecting the kneaded mixture to a film-forming process using a calendar, roll, T-die extrusion or inflation to form a film of a predetermined shape. When a support is used, it is necessary to form a film on the support. A more preferred process for forming the photo-curable sheet comprises the steps of dissolving homogeneously the ingredients in a good solvent, applying the resultant solution onto a separator coated closely with silicone or fluoric resin (or the support) by means of flow-coater method, roll-coater method, gravure-roll method, mayer-bar method or lip-die coating method, and vaporizing the solvent.

The thickness of the photo-curable transfer layer generally is in the range of 1 to 1,200 μm, preferably 5 to 500 μm, especially 5 to 300 μm (preferably not more than 150 μm). When the thickness is thinner than 1 μm, sealing properties are lowered and maybe the layer does not full up the unevenness of the transparent substrate. When the thickness is thicker than 1,200 μm, the thickness of the resultant recording medium is so thick that trouble in housing or assembly of the medium or reverse influence in light transmittance possibly occurs.

The photo-curable transfer layer preferably has a release sheet on its both sides.

The release sheet is preferably composed of chiefly transparent organic resin having a glass transition temperature of not less than 50° C. Examples of the transparent organic resin include polyester resin (e.g., polyethylene terephthalate, polycyclohexylene terephthalate, polyethylene naphthalate), polyamide (e.g., nylon 46, modified nylon 6T, nylon MXD6, polyphthalamide), ketone resin (e.g., polyphenylene sulfide, polythioether sulfone), sulfone resin (e.g., polysulfone, polyether sulfone), polyether nitrile, polyarylate, polyether imide, polyamideimide, polycarbonate, polymethyl methacrylate, triacetylcellulose, polystyrene or polyvinyl chloride. Of these resins, polycarbonate, polymethyl methacrylate, polyvinyl chloride, polystyrene and polyethylene terephthalate can be preferably employed. The thickness is generally in the range of 10 to 200 μm, especially in the range of 30 to 100 μm.

The substrate 21 having uneven surface used in the invention is preferably composed of chiefly transparent organic resin having a glass transition temperature of not less than 50° C. Examples of the transparent organic resin include polyester resin (e.g., polyethylene terephthalate, polycyclohexylene terephthalate, polyethylene naphthalate), polyamide (e.g., nylon 46, modified nylon 6T, nylon MXD6, polyphthalamide), ketone resin (e.g., polyphenylene sulfide, polythioether sulfone), sulfone resin (e.g., polysulfone, polyether sulfone), polyether nitrile, polyarylate, polyether imide, polyamideimide, polycarbonate, polymethyl methacrylate, triacetylcellulose, polystyrene or polyvinyl chloride. Of these resins, polycarbonate, polymethyl methacrylate, polyvinyl chloride, polystyrene and polyethylene terephthalate are excellent in transferring properties and bire—therefore can be preferably employed. The thickness is generally in the range of 200 to 2,000 μm, especially in the range of 500 to 1,500 μm.

The polymer film 26 for protection used in the invention is preferably composed of chiefly transparent organic resin having a glass transition temperature of not less than 50° C. Examples of the transparent organic resin include polyester resin (e.g., polyethylene terephthalate, polycyclohexylene terephthalate, polyethylene naphthalate), polyamide (e.g., nylon 46, modified nylon 6T, nylon MXD6, polyphthalamide), ketone resin (e.g., polyphenylene sulfide, polythioether sulfone), sulfone resin (e.g., polysulfone, polyether sulfone), polyether nitrile, polyarylate, polyether imide, polyamideimide, polycarbonate, polymethyl methacrylate, triacetylcellulose, polystyrene or polyvinyl chloride. Of these resins, polycarbonate, polymethyl methacrylate, polyvinyl chloride, polystyrene and polyethylene terephthalate are excellent in transparency and birefringence, and therefore can be preferably employed. The thickness is generally in the range of 10 to 200 μm, especially in the range of 50 to 100 μm.

The resultant photo-curable transfer sheet comprises the photo-curable composition containing the polymer having a glass transition temperature (Tg) of not less than 80° C., and further preferably has a light transmittance of not less than 70% in a wavelength rang of 380 to 420 nm.

The photo-curable transfer sheet generally has a light transmittance of not less than 70% in a wavelength rang of 380 to 420 nm, preferably 380 to 800 nm, whereby reduction of the strength of signals to be read out with a laser beam can be prevented. Further, the sheet preferably has a light transmittance of not less than 80% in a wavelength rang of 380 to 420 nm.

The photo-curable transfer sheet of the invention can be obtained as a film accurately controlled in the thickness, and therefore it is possible to easily and precisely bond the sheet to the uneven surface such as the substrate or stamper. This bonding (contact bonding) can be easily carried out by depressing the sheet and stamper by means of an easy method using pressure rollers or easy press to temporarily bond them at temperature of 20 to 100° C., and then curing the sheet by exposing it to light at room temperature for one to tens seconds. Further, the temporarily bonded laminate is free from occurrence of slippage (sagging) or peeling between of the sheet and stamper or substrate owing to its autohesion force, and hence the laminate can be freely handled until the light-curing step.

In case the photo-curable transfer sheet of the invention is cured, it is possible to adopt, as light source used, various sources generating light in the wavelength range of from ultraviolet to visible rays. Examples of the sources include super-high-pressure, high-pressure and low-pressure mercury lamps, a chemical lamp, a xenon lamp, a halogen lamp, a mercury halogen lamp, a carbon arc lamp, and an incandescent electric lamp, and laser beam. The exposing time is generally in the range of 0.1 second to dozens seconds, preferably 0.5 second to a few seconds, depending upon kinds of the lamp and strength of light. The amount of the ultraviolet exposure preferably is not less than 300 mJ/cm$^2$.

To promote the curing, the laminate may be heated beforehand for 30 to 80° C., and then the heated laminate may be exposed to ultraviolet rays.

The reflective layer of the invention on an uneven surface of the substrate is formed by vapor-depositing (e.g., spattering, vacuum deposition, ion-plating) metal material on the substrate. Examples of the metal material include aluminum, gold, silver or alloys thereof. The half-transparent (semitransparent) reflective layer provided on the cured sheet is formed by using silver, etc. as metal material. In more detail, the semitransparent reflective layer is occasionally required to have lower reflectivity compared with the reflective layer and therefore is formed by changing the materials and/or the thickness.

When the organic polymer film is bonded onto the reflective layer of the cured sheet, an adhesive is applied onto one of the film and the sheet, and the other is superposed on the adhesive layer to be cured. When the adhesive is UV-curable resin, it is cured by UV irradiation (exposure), and when the adhesive is hot-melt type, it is applied to the reflective layer under heating and then cooled.

In the preparation of the optical information recording medium of the invention, it is continuously processed in the form of disc. However, it may be processed in the form of sheet and finally punched out in the form of disc.

The invention is illustrated in detail using the following Examples.

EXAMPLE

The invention is further illustrated by the following Examples.

Example 1

Preparation of Photo-Curable Transfer Sheet (Preparation of Polymer 1 Having Hydroxyl Group)
Polymer Formulation 1

| | |
|---|---|
| Methyl methacrylate | 74.6 parts by weight |
| n-Butyl methacrylate | 13.2 parts by weight |
| 2-Hydroxyethyl methacrylate | 12.1 parts by weight |
| AIBN | 1.2 parts by weight |
| Toluene | 70 parts by weight |
| Ethyl acetate | 30 parts by weight |

A mixture of the above Formulation 1 was heated to 70° C. with moderately stirring to initiate the polymerization, and stirred at this temperature for 8 hours to provide polymer 1 (acrylic resin) having a hydroxyl group on its side chain. The solid content was adjusted to 36% by weight (polymer solution 1).

The polymer 1 had Tg of 100° C. and weight average molecular weight of 110,000.

Composition Formulation 1

| | |
|---|---|
| Solution 1 of polymer having hydroxyl group | 100 parts by weight |
| Hexanediol dimethacrylate (KS-HDDA) | 110 parts by weight |
| Diisocyanate | 1 part by weight |
| (BXX5627, available from Toyo Ink Mfg.) | |
| Irgercure 651 (available from Chiba-Geigy) | 1 part by weight |
| Hydroquinone monomethyl ether (MEHQ) | 0.05 part by weight |

The above Formulation 1 was homogeneously dissolved to give a mixture, which was applied onto a whole surface of a release sheet (width: 140 mm, length: 300 m, thickness: 75 µm; trade name: No. 23, available from Fujimori Kogyo) and dried to form a photo-curable transfer layer of thickness of 20 µm. Subsequently, a release sheet that is the same as above is applied to the opposite side of the photo-curable transfer layer to be rolled up in the form of roll. Thus, a full-edge type roll of photo-curable transfer sheet of diameter of 260 mm was prepared. The transfer layer of photo-curable transfer sheet had Tg of 0° C.

Example 2

Preparation of Photo-Curable Transfer Sheet (Preparation of Polymer 2 Having Acryloyl Group)
Polymer Formulation 2

| | |
|---|---|
| Methyl methacrylate | 74 parts by weight |
| n-Butyl methacrylate | 13 parts by weight |
| Glycidyl methacrylate | 12 parts by weight |
| AIBN | 1.2 parts by weight |
| Toluene | 70 parts by weight |
| Ethyl acetate | 30 parts by weight |

A mixture of the above Formulation 2 was heated to 70° C. with moderately stirring to initiate the polymerization, and stirred at this temperature for 8 hours to provide polymer (acrylic resin) having a glycidyl group on its side chain. Acrylic acid (6.6 parts by weight) was added the polymer solution, which was heated to 70° C., and stirred at this temperature for 5 hours to provide polymer 2 (acrylic resin) having an acryloyl group. The solid content was adjusted to 36% by weight (polymer solution 2).

The polymer 2 had Tg of 100° C. and weight average molecular weight of 110,000.

Composition Formulation 2

| | |
|---|---|
| Solution 2 of polymer having acryloyl group | 100 parts by weight |
| Hexanediol dimethacrylate (KS-HDDA) | 110 parts by weight |
| Diisocyanate (BXX5627, available from Toyo Ink Mfg.) | 1 part by weight |
| Irgercure 651 (available from Chiba-Geigy) | 1 part by weight |
| Hydroquinone monomethyl ether (MEHQ) | 0.05 part by weight |

The above Formulation 2 was homogeneously dissolved to give a mixture, which was applied onto a whole surface of a release sheet (width: 140 mm, length: 300 m, thickness: 75 μm; trade name: No. 23, available from Fujimori Kogyo) and dried to form a photo-curable transfer layer of thickness of 20 μm. Subsequently, a release sheet that is the same as above is applied to the opposite side of the photo-curable transfer layer to be rolled up in the form of roll. Thus, a full-edge type roll of photo-curable transfer sheet of diameter of 260 mm was prepared. The transfer layer of photo-curable transfer sheet had Tg of 0° C.

Comparison Example 1

Preparation of Photo-Curable Transfer Sheet (Preparation of Polymer 3 (Macromer 3))
Polymer Formulation 3

| | |
|---|---|
| 2-Ethylhexyl methacrylate | 70 parts by weight |
| Methyl methacrylate | 20 parts by weight |
| 2-Hydroxyethyl methacrylate | 10 parts by weight |
| Benzophenone | 1.2 parts by weight |
| Toluene | 70 parts by weight |
| Ethyl acetate | 30 parts by weight |

A mixture of the above Formulation 1 was heated to 60° C. with moderately stirring to initiate the polymerization, and stirred at this temperature for 10 hours to provide polymer (acrylic resin) having a hydroxyl group on its side chain. 5 parts by weight of Calens MOI (2-isocyanatoethyl methacrylate; available from Showa Denko K.K.) was added the polymer solution, which was heated to 50° C., and stirred at this temperature for 5 hours under a nitrogen atmosphere to provide a solution of macromer 3 having an acryloyl group. The solid content was adjusted to 36% by weight (polymer solution 3).

The polymer 3 (macromer 3) had Tg of 30° C. and weight average molecular weight of 110,000.

Composition Formulation 2

| | |
|---|---|
| Solution 3 of polymer having acryloyl group | 100 parts by weight |
| Hexanediol dimethacrylate (KS-HDDA) | 40 parts by weight |
| Diisocyanate (BXX5627, available from Toyo Ink Mfg.) | 1 part by weight |
| Irgercure 651 (available from Chiba-Geigy) | 1 part by weight |
| Hydroquinone monomethyl ether (MEHQ) | 0.05 part by weight |

The above Formulation 3 was homogeneously dissolved to give a mixture, which was applied onto a whole surface of a release sheet (width: 300 mm, length: 1,000 m, thickness: 75 μm; trade name: No. 23, available from Fujimori Kogyo) and dried to form a photo-curable transfer layer of thickness of 20 μm. Subsequently, a release sheet that is the same as above is applied to the opposite side of the photo-curable transfer layer to be rolled up in the form of roll. Thus, a full-edge type roll of photo-curable transfer sheet of diameter of 0.5 m was prepared. The transfer layer of photo-curable transfer sheet had Tg of 0° C.

Example 3

Example 1 was repeated except that the procedure for preparation of Composition Formulation 1 was carried out using 5 parts by weight of AIBN instead of 1.2 parts by weight of AIBN to prepare Composition Formulation 4, to prepare a full-edge type roll of photo-curable transfer sheet.

The polymer 4 had Tg of 100° C. and weight average molecular weight of 30,000. The transfer layer of photo-curable transfer sheet had Tg of 0° C.

Comparison Example 2

Example 1 was repeated except that the procedure for preparation of Composition Formulation 1 was carried out using 70 parts by weight of hexanediol dimethacrylate instead 110 parts by weight of hexanediol dimethacrylate, to prepare a full-edge type roll of photo-curable transfer sheet.

The transfer layer of photo-curable transfer sheet had Tg of 30° C.

Comparison Example 3

Preparation of Photo-Curable Transfer Sheet (Preparation of Polymer 5 Having Hydroxyl Group)
Polymer Formulation 5

| | |
|---|---|
| Methyl methacrylate | 32 parts by weight |
| n-Butyl methacrylate | 57 parts by weight |
| 2-Hydroxyethyl methacrylate | 11 parts by weight |
| AIBN | 1.2 parts by weight |
| Toluene | 70 parts by weight |
| Ethyl acetate | 30 parts by weight |

A mixture of the above Formulation 1 was heated to 150° C. with moderately stirring to initiate the polymerization, and stirred at this temperature for 3 hours to provide polymer 5 (acrylic resin) having a hydroxyl group on its side chain. The solid content was adjusted to 36% by weight.

The polymer 5 had Tg of 60° C. and weight average molecular weight of 110,000.

Composition Formulation 5

| | |
|---|---|
| Solution 5 of polymer having hydroxyl group | 100 parts by weight |
| Hexanediol dimethacrylate (KS-HDDA) | 110 parts by weight |
| Diisocyanate (BXX5627, available from Toyo Ink Mfg.) | 0.5 part by weight |
| Irgercure 651 (available from Chiba-Geigy) | 1 part by weight |
| Hydroquinone monomethyl ether (MEHQ) | 0.05 part by weight |

The above Formulation 5 was homogeneously dissolved to give a mixture, which was applied onto a whole surface of a release sheet (width: 140 mm, length: 300 m, thickness: 75 µm; trade name: No. 23, available from Fujimori Kogyo) and dried to form a photo-curable transfer layer of thickness of 20 µm. Subsequently, a release sheet that is the same as above is applied to the opposite side of the photo-curable transfer layer to be rolled up in the form of roll. Thus, a full-edge type roll of photo-curable transfer sheet of diameter of 260 mm was prepared. The transfer layer of photo-curable transfer sheet had Tg of 0° C.

Example 4

Example 1 was repeated except that the procedure for preparation of Composition Formulation 1 was carried out without using the diisocyanate, to prepare a full-edge type roll of photo-curable transfer sheet.

The transfer layer of photo-curable transfer sheet had Tg of 0° C.

(1) Evaluation of Photo-Curable Transfer Sheet (1-1) Determination of Glass Transition Temperature (Tg)

The release sheets on the both side of the photo-curable transfer sheet are removed from the transfer sheet, and the resultant transfer sheets (layers) are cut into a size of length of 20.0 mm and width of 4.0 mm (thickness: 25 µm) to prepare samples.

Tg of the samples are measured by use of a TMA (Thermal Mechanical Analysis) device SS6100 (available from SII Nano Technology Inc.) under the conditions of sample temperature of 30-120° C., temperature rising rate of 5° C./min. and tension of $4.9 \times 10^5$ Pa.

Figure 5:
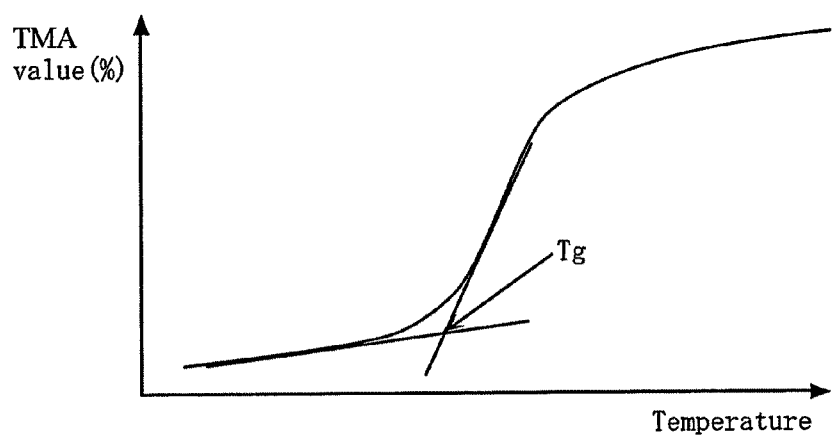
FIG. 5 is a graph used in the determination of glass transition temperature (Tg).
Figure 6:
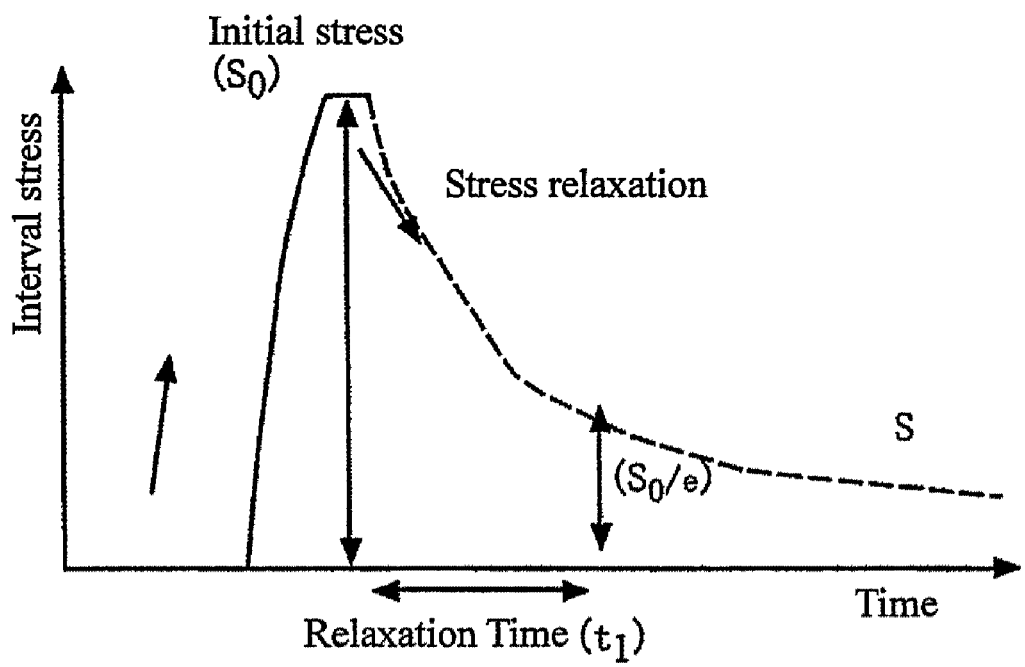
FIG. 6 is a graph showing the relationship between the initial stress $S_0$ and the relaxation time t1.
Figure 7:
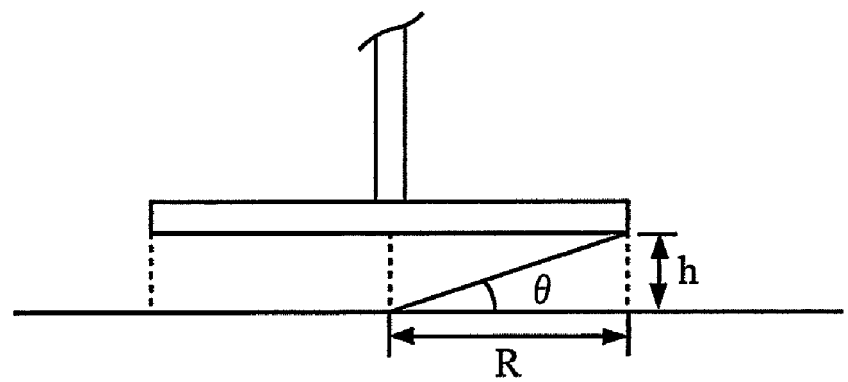
FIG. 7 is a view showing the relationship between R, h and θ used for determining the displacement.
Figure 8:
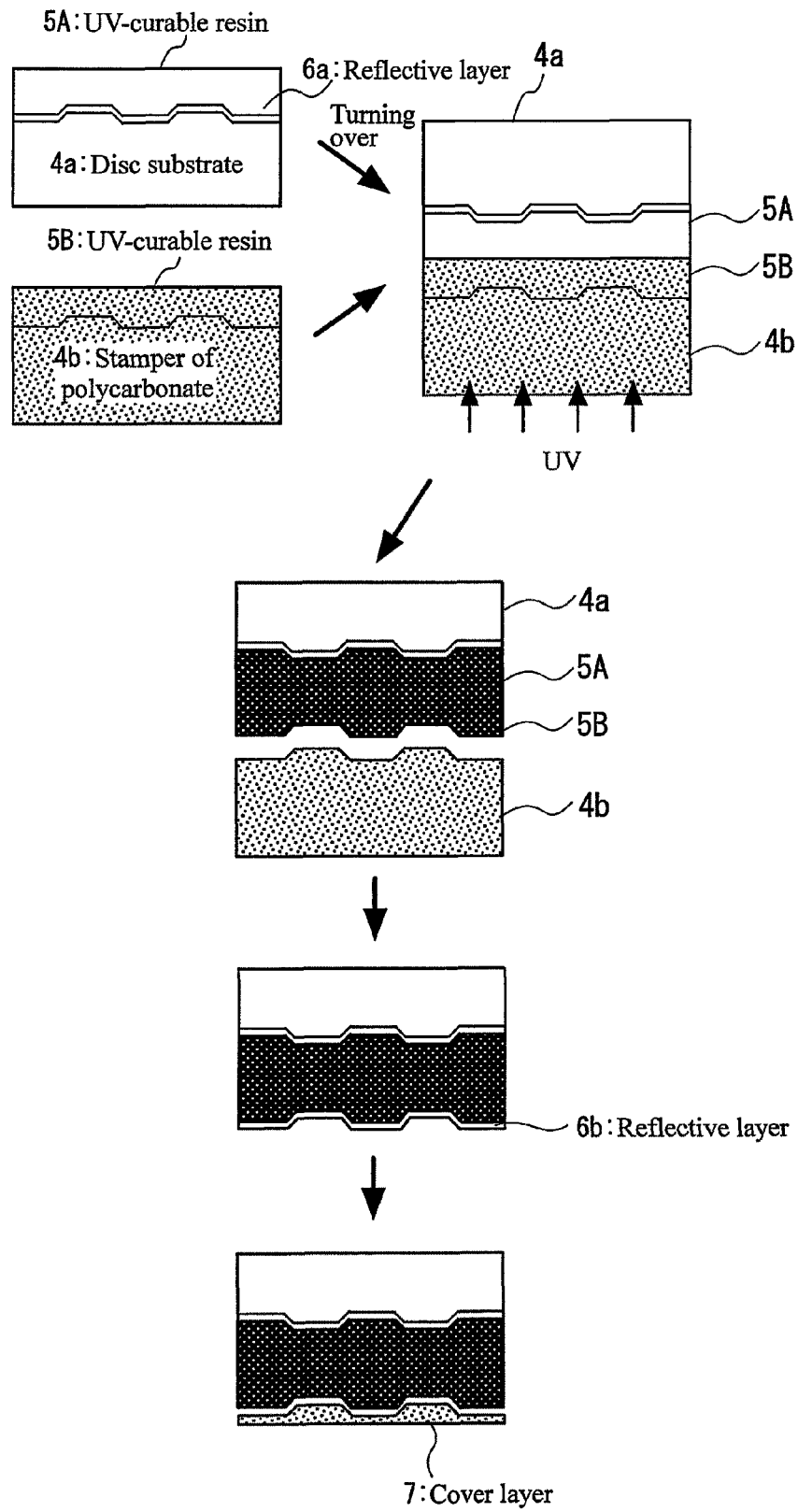
FIG. 8 is a section view showing the procedure for a process for the preparation of an optical information recording medium described in NIKKEI ELECTRONICS.

The data measured under the above conditions brings about a graph of FIG. 5, and intersection of tangential line of stable region with tangential line of maximum gradient of expanding region is decided to glass transition temperature.

(1-2) Exudation

The rolls obtained from Examples 1-4 and Comparison Examples 1-3 are allowed to stand at room temperature for 24 hours, and then the exudation of the transfer layer in the lateral side of each of the rolls is observed. The extend of the exudation is evaluated as follows:

○: Exudation of less than 20 µm

Δ: Exudation of 20-50 µm

X: Exudation of more than 50 µm (2) Preparation of Optical Information Recording Medium After the photo-curable transfer sheet was punched out in the form of disc, one release sheet of the resultant disc-shaped photo-curable transfer sheet was removed, and the photo-curable transfer sheet was placed on a semi-transparent reflective layer of silver alloy formed on an uneven surface of a polycarbonate substrate (thickness: 1.1 mm) having the uneven surface as pits formed by injection molding such that the surface of the transfer sheet was in contact with the reflective layer, and depressed using a roller made of silicone rubber under load of 2 kg to form a laminate (corresponding to (3) of FIG. 2).

Subsequently, the other release sheet of the transfer sheet of the laminate was removed, and an uneven surface of a nickel stamper having the uneven surface as pits was placed on the exposed surface of the transfer sheet such that the uneven surface was in contact with the exposed surface, and the stamper was depressed using a roller made of silicone rubber under load of 2 kg to form a laminate, whereby the uneven surface of the stamper was transferred to the exposed surface of the transfer sheet.

Subsequently, the photo-curable transfer sheet of the laminate was exposed to UV-rays through the half-transparent reflective layer of silver alloy under the condition of an integrated amount of light of 300 mJ/cm² (exposure distance: 15 cm, exposure time: 1.0 sec.) using a metal halide lamp (600 mW/cm) and as a result, the transfer sheet (transfer layer) was cured.

The stamper was peeled from the laminate, and silver alloy was sputtered onto the uneven surface of the cured photo-curable transfer sheet to form a thick silver alloy reflective layer (70 nm). A polycarbonate film (thickness: 70 µm, trade name: Pure Ace C-110-70, available from TEIJIN LIMITED.) was attached onto the reflective layer through adhesive.

Thus, an optical information recording medium having two uneven surfaces was prepared.

(2) Evaluation of Optical Information Recording Medium (2-1) Determination of Glass Transition Temperature (Tg)

The samples obtained in the same manner as the item (1-1) are exposed to UV-rays under the condition of an integrated amount of light of 300 mJ/cm², and then Tg of each of the samples is measured in the same manner as the item (1-1).

The integrated amount of light is determined by measuring it on the surface of the sample by use of UV Power Pack (measurement of UV-A band) available from Fusion UV System Japan KK.

(2-2) Curing Property (Peeling Property of Ni Stamper)

Force required for peeling the Ni stamper from the laminate for optical information recording medium is measured. As a device for the measurement, a peeling tester with robot arm (trade name: HEIDON, available from Shinto Scientific Co., Ltd) is used.

The smaller the force required for peeling the better the curing property. The extent of the curing property is evaluated as follows:

○: Less than 5 gf/25 mm

Δ: 5-10 gf/25 mm

X: More than 10 gf/25 mm (2-3) Transferring Property of Pits (Readout of Signals) (Initial Value, amount of change)

As for the resultant optical information recording media, the depth of the pits formed by the stamper is measured by a probe microscope (SPA-300HV Environment Control Unit, available from SII Nano technology Inc.). The evaluation is carried out as follows:

(1) Initial value

○: Depth of pits of not less than 97 nm

Δ: Depth of pits of not less than 90 nm and less than 97 nm

X: Depth of pits of less than 90 nm (2) Amount of change

The resultant optical information recording media are allowed to stand at 23° C. for 48 hours, and then the depth of the pits of each of the media is measured in the same manner as above. The evaluation is carried out as follows:

○: Amount of change of less than 1 nm

Δ: Amount of change of 1-3 nm

X: Amount of change of more than 3 nm

The obtained results are shown in Table 1.

TABLE 1

| | Ex. 1 | Ex. 2 | Co. Ex. 1 | Ex. 3 | Co. Ex. 2 | Co. Ex. 3 | Ex. 4 |
|---|---|---|---|---|---|---|---|
| [Composition of Transfer Layer] | | | | | | | |
| Polymer 1 (containing OH) | 100 | — | — | — | 100 | — | 100 |
| Polymer 2 (containing $CH_2$=CHCO) | — | 100 | — | — | — | — | — |
| Polymer 3 (Macromer) | — | — | 100 | — | — | — | — |
| Polymer 4 (Low Mw type of 1) | — | — | — | 100 | — | — | — |
| Polymer 5 (Low Tg type of 1) | — | — | — | — | — | 100 | — |
| KS-HDDA | 110 | 110 | 40 | 110 | 70 | 110 | 110 |
| Irg. 651 | 1 | 1 | 1 | 1 | 1 | 1 | 1 |
| BXX5627 | 1 | 1 | 1 | 1 | 1 | 1 | 0 |
| MEHQ | 0.05 | 0.05 | 0.05 | 0.05 | 0.05 | 0.05 | 0.05 |
| [Properties] Polymer: | | | | | | | |
| Tg (° C.) | 100 | 100 | 30 | 100 | 100 | 60 | 100 |
| Mw | 110000 | 110000 | 110000 | 30000 | 110000 | 110000 | 110000 |
| Transfer layer: | | | | | | | |
| Tg (° C.) | 0 | 0 | 0 | 0 | 30 | 0 | 0 |
| Tg after UV | 65 | 65 | 50 | 65 | 65 | 50 | 65 |
| [Evaluation] | | | | | | | |
| Exudation | ○ | ○ | ○ | Δ | ○ | ○ | Δ |
| Curing property | ○ | ○ | X | ○ | ○ | ○ | ○ |
| Pit transferring: | | | | | | | |
| Initial | ○ | ○ | X | Δ | X | ○ | ○ |
| After test | ○ | ○ | — | ○ | — | X | ○ |

The photo-curable transfer sheets obtained from Examples 1 to 4 show excellent curing property and transferring property of pits (especially long-term maintaining property of shape of pits). However, because the photo-curable transfer sheet of Example 3 uses the polymer having low molecular weight and the photo-curable transfer sheet of Example 4 does not use the diisocyanate for post-curing, both the transfer sheets have slightly inferior in exudation. In contrast, the photo-curable transfer sheets obtained from Comparison Examples 1 to 3 show inferior curing property and transferring property of pits because they do not satisfy the definition of Tg according to the invention.

Example 5

Preparation of Photo-Curable Transfer Sheet (Preparation of Polymer 6 Having Hydroxyl Group)
Polymer Formulation 6

| | |
|---|---|
| Methyl methacrylate | 74.6 parts by weight |
| n-Butyl methacrylate | 13.2 parts by weight |
| 2-Hydroxyethyl methacrylate | 12.1 parts by weight |
| AIBN | 5 parts by weight |
| Toluene | 50 parts by weight |
| Ethyl acetate | 50 parts by weight |

A mixture of the above Formulation 6 was heated to 70° C. with moderately stirring to initiate the polymerization, and stirred at this temperature for 8 hours to provide polymer 6 (acrylic resin) having a hydroxyl group on its side chain. The solid content was adjusted to 36% by weight (polymer solution 6).

The polymer 6 had Tg of 100° C. and weight average molecular weight of 110,000.

Composition Formulation 6

| | |
|---|---|
| Solution 6 of polymer having hydroxyl group | 100 parts by weight |
| Hexanediol dimethacrylate (KS-HDDA) | 110 parts by weight |
| Diisocyanate (BXX5627, available from Toyo Ink Mfg.) | 1 part by weight |
| Irgercure 651 (available from Chiba-Geigy) | 1 part by weight |
| Hydroquinone monomethyl ether (MEHQ) | 0.05 part by weight |

The above Formulation 6 was homogeneously dissolved to give a mixture, which was applied onto a whole surface of a release sheet (width: 140 mm, length: 300 m, thickness: 75 μm; trade name: No. 23, available from Fujimori Kogyo) and dried to form a photo-curable transfer layer of thickness of 25 μm. Subsequently, a release sheet that is the same as above is applied to the opposite side of the photo-curable transfer layer to be rolled up in the form of roll. Thus, a full-edge type roll of photo-curable transfer sheet of diameter of 260 mm was prepared. The transfer layer of photo-curable transfer sheet had Tg of 0° C. Further the photo-curable transfer layer had initial stress of 500 Pa and relaxation time of 3 seconds.

Example 6

Preparation of Photo-Curable Transfer Sheet (Preparation of Polymer 7 Having Acryloyl Group)
Polymer Formulation 7

| | |
|---|---|
| Methyl methacrylate | 74 parts by weight |
| n-Butyl methacrylate | 13 parts by weight |
| Glycidyl methacrylate | 12 parts by weight |
| AIBN | 5 parts by weight |
| Toluene | 50 parts by weight |
| Ethyl acetate | 50 parts by weight |

A mixture of the above Formulation 7 was heated to 70° C. with moderately stirring to initiate the polymerization, and stirred at this temperature for 8 hours to provide polymer (acrylic resin) having a glycidyl group on its side chain. Acrylic acid (6.6 parts by weight) was added the polymer solution, which was heated to 70° C., and stirred at this temperature for 5 hours to provide polymer 7 (acrylic resin) having an acryloyl group. The solid content was adjusted to 36% by weight (polymer solution 7).

The polymer 7 had Tg of 100° C. and weight average molecular weight of 110,000.

Composition Formulation 7

| | |
|---|---|
| Solution 7 of polymer having acryloyl group | 100 parts by weight |
| Hexanediol dimethacrylate (KS-HDDA) | 110 parts by weight |
| Diisocyanate (BXX5627, available from Toyo Ink Mfg.) | 1 part by weight |
| Irgercure 651 (available from Chiba-Geigy) | 1 part by weight |
| Hydroquinone monomethyl ether (MEHQ) | 0.05 part by weight |

The above Formulation 7 was homogeneously dissolved to give a mixture, which was applied onto a whole surface of a release sheet (width: 140 mm, length: 300 m, thickness: 75 µm; trade name: No. 23, available from Fujimori Kogyo) and dried to form a photo-curable transfer layer of thickness of 20 µm. Subsequently, a release sheet that is the same as above is applied to the opposite side of the photo-curable transfer layer to be rolled up in the form of roll. Thus, a full-edge type roll of photo-curable transfer sheet of diameter of 260 mm was prepared. The transfer layer of photo-curable transfer sheet had Tg of 0° C. Further the photo-curable transfer layer had initial stress of 400 Pa and relaxation time of 3 seconds.

Comparison Example 4

Example 5 was repeated except that the procedure for preparation of Composition Formulation 6 was carried out using 70 parts by weight of hexanediol dimethacrylate instead 110 parts by weight of hexanediol dimethacrylate, to prepare a full-edge type roll of photo-curable transfer sheet.

The transfer layer of photo-curable transfer sheet had Tg of 0° C. Further the photo-curable transfer layer had initial stress of 2,000 Pa and relaxation time of 30 seconds.

Comparison Example 5

Preparation of Photo-Curable Transfer Sheet (Preparation of Polymer 8)
Polymer Formulation 8

| | |
|---|---|
| 2-Butyl methacrylate | 57 parts by weight |
| Methyl methacrylate | 32 parts by weight |
| 2-Hydroxyethyl methacrylate | 11 parts by weight |
| Benzophenone | 5 parts by weight |
| Toluene | 30 parts by weight |
| Ethyl acetate | 30 parts by weight |

A mixture of the above Formulation 8 was heated to 60° C. with moderately stirring to initiate the polymerization, and stirred at this temperature for 10 hours to provide polymer (acrylic resin) having a hydroxyl group on its side chain. 5 parts by weight of Calens MOI (2-isocyanatoethyl methacrylate; available from Showa Denko K.K.) was added the polymer solution, which was heated to 50° C., and stirred at this temperature under a nitrogen atmosphere to provide a solution of macromer 8 having an acryloyl group. The solid content was adjusted to 36% by weight (polymer solution 8).

The polymer 8 had Tg of 30° C. and weight average molecular weight of 110,000.

Composition Formulation 8

| | |
|---|---|
| Solution 8 of polymer having acryloyl group | 100 parts by weight |
| Hexanediol dimethacrylate (KS-HDDA) | 110 parts by weight |
| Diisocyanate (BXX5627, available from Toyo Ink Mfg.) | 1 part by weight |
| Irgercure 651 (available from Chiba-Geigy) | 1 part by weight |
| Hydroquinone monomethyl ether (MEHQ) | 0.05 part by weight |

The above Formulation 8 was homogeneously dissolved to give a mixture, which was applied onto a whole surface of a release sheet (width: 300 mm, length: 1,000 m, thickness: 75 µm; trade name: No. 23, available from Fujimori Kogyo) and dried to form a photo-curable transfer layer of thickness of 20 µm. Subsequently, a release sheet that is the same as above is applied to the opposite side of the photo-curable transfer layer to be rolled up in the form of roll. Thus, a full-edge type roll of photo-curable transfer sheet of diameter of 0.5 m was prepared.

The transfer layer of photo-curable transfer sheet had Tg of 0° C. Further the photo-curable transfer layer had initial stress of 400 Pa and relaxation time of 3 seconds.

(1) Evaluation of photo-curable transfer sheet (Examples 5, 6 and Comparison Examples 4, 5)

(1-1) Determination of Glass Transition Temperature (Tg)

The release sheets on the both side of the photo-curable transfer sheet are removed from the transfer sheet, and the resultant transfer sheets (layers) are cut into a size of length of 20.0 mm and width of 4.0 mm (thickness: 25 µm) to prepare samples.

Tg of the samples are measured by use of a TMA (Thermal Mechanical Analysis) device SS6100 (available from SII Nano Technology Inc.) under the conditions of sample temperature of 30-120° C., temperature rising rate of 5° C./min. and tension of $4.9 \times 10^5$ Pa.

The data measured under the above conditions brings about a graph of FIG. 5, and intersection of tangential line of stable region with tangential line of maximum gradient of expanding region is decided to glass transition temperature.

(1-2) Measurement of Initial Stress and Relaxation Time of Transfer Layer of Photo-Curable Transfer Sheet Samples having thickness of 200 μm and diameter of 8 mm obtained from the transfer sheets of examples 5, 6 and comparison examples 4, 5 are subjected to creep recovery measurement by using a parallel plate fixture (jig) under the conditions of measuring temperature of 50° C. and displacement of 10%, whereby initial stresses and relaxation times of the samples are obtained. The measurement is carried out by using RheoStress RS300 (available from HAAKE) as a dynamic viscoelasticity measuring apparatus.

(2) Preparation of Optical Information Recording Medium

After the photo-curable transfer sheet was punched out in the form of disc, one release sheet of the resultant disc-shaped photo-curable transfer sheet was removed, and the resultant photo-curable transfer sheet was placed on a half-transparent reflective layer of silver alloy formed on an uneven surface of a polycarbonate substrate (thickness: 1.1 mm) having the uneven surface as pits formed by injection molding such that the surface of the transfer sheet was in contact with the reflective layer, and depressed using a roller made of silicone rubber under load of 2 kg to form a laminate (corresponding to (3) of FIG. 2).

Subsequently, the other release sheet of the transfer sheet of the laminate was removed, and an uneven surface of a nickel stamper having the uneven surface as pits was placed on the exposed surface of the transfer sheet such that the uneven surface was in contact with the exposed surface, and the stamper was depressed using a roller made of silicone rubber under load of 2 kg to form a laminate, whereby the uneven surface of the stamper was transferred to the exposed surface of the transfer sheet.

Subsequently, the photo-curable transfer sheet of the laminate was exposed to UV-rays through the half-transparent reflective layer of silver alloy under the condition of an integrated amount of light of 300 mJ/cm$^2$ (exposure distance: 20 cm, exposure time: 1.0 sec.) using a metal halide lamp (600 mW/cm) and as a result, the transfer sheet (transfer layer) was cured.

The stamper was peeled from the laminate, and silver alloy was sputtered onto the uneven surface of the cured photo-curable transfer sheet to form a thick silver alloy reflective layer (70 nm) having high reflectivity. A polycarbonate film (thickness: 70 μm, trade name: Pure Ace C-110-70, available from TEIJIN LIMITED.) was attached onto the reflective layer through adhesive.

Thus, an optical information recording medium having two uneven surfaces was prepared.

(2) Evaluation of Optical Information Recording Medium (2-1) Determination of Glass Transition Temperature (Tg)

The samples obtained in the same manner as the item (1-1) are exposed to UV-rays under the condition of an integrated amount of light of 300 mJ/cm$^2$, and then Tg of each of the samples is measured in the same manner as the item (1-1).

The integrated amount of light is determined by measuring it on the surface of the sample by use of UV Power Pack (measurement of UV-A band) available from Fusion UV System Japan KK.

(2-2) Residual Stress of Transfer Layer after Curing

As mentioned above, the photo-curable transfer layer having been subjected to ultraviolet exposure for t2 time period (second) has residual stress (S), the residual stress being represented by the following formula:

$$S = S_0 \times e^{-t2/t1}$$

in which $S_0$ represents the initial stress (Pa) of the photo-curable transfer layer before being subjected to ultraviolet exposure, and t1 represents the relaxation time required for the initial stress to change 1/e thereof.

The same samples as used in the measurement of the initial stress and relaxation time are allowed to stand at 23° C. for 48 hours, and thereafter each of the sample is exposed to ultraviolet rays until its hardness attains a defined hardness (i.e., 80N/mm which is measured by a micro hardness tester available from Fisher Instrument). The exposure time t2 required for the sample to attain the defined hardness is determined and, by using the value of t2, the residual stress S is determined by the above formula. The exposure time t2 was one second which is the same as in the preparation condition of the optical information recording medium.

(2-3) Transferring Property of Pits (Depth of Pits, Modulation, Jitter)

(2-3-1) As for the resultant optical information recording media, the depth of the pits formed by the stamper is measured by a probe microscope (SPA-300HV Environment Control Unit, available from SII Nano technology Inc.). The evaluation is carried out as follows:

○: Depth of pits of not less than 97 nm

Δ: Depth of pits of not less than 90 nm and less than 97 nm

X: Depth of pits of less than 90 nm (2-3-2) As for the resultant optical information recording media, the modulation of the pit-signals formed by the stamper is measured by a Time Interval Analyzer TA 723 (available from Yokogawa Electric Corporation). The evaluation is carried out as follows:

○: Not less than 0.70

Δ: Not less than 65 and less than 0.70

X: Less than 0.65

(2-3-3) As for the resultant optical information recording media, the jitter of the pit-signals formed by the stamper is measured by a Time Interval Analyzer TA 723 (available from Yokogawa Electric Corporation). The evaluation is carried out as follows:

○: Not more than 6.0

Δ: More than 6.0 and not more than 7.5

X: More than 7.5

(2-4) Amount of Change after Durability Test (2-4-1) The resultant optical information recording media are allowed to stand at 23° C. for 48 hours, and then the depth of the pits of each of the media is measure in the same manner as above. The amount of change is carried out as follows:

○: Amount of change of less than 1 nm

Δ: Amount of change of 1-3 nm

X: Amount of change of more than 3 nm (2-4-2) The resultant optical information recording media are allowed to stand at 23° C. for 48 hours, and then the modulation of each of the media is measure in the same manner as above. The amount of change is carried out as follows:

○: Amount of change of less than 0.02

Δ: Amount of change of 0.02-0.05

X: Amount of change of more than 0.05

(2-4) Amount of Change after Durability Test (2-4-1) The resultant optical information recording media are allowed to stand at 23° C. for 48 hours, and then the jitter of each of the media is measure in the same manner as above. The amount of change is carried out as follows:

○: Amount of change of less than 1.0%

Δ: Amount of change of 1.0-3.0%

X: Amount of change of more than 3.0%

The obtained results are shown in Table 2.

TABLE 2

|  | Ex. 5 | Ex. 6 | Co. Ex. 4 | Co. Ex. 5 |
|---|---|---|---|---|
| [Composition of Transfer Layer] | | | | |
| Polymer 6 (containing OH) | 100 | — | 100 | — |
| Polymer 7 (containing $CH_2=CHCO$) | — | 100 | — | — |
| Polymer 8 (Macromer) | — | — | — | 100 |
| KS-HDDA | 110 | 110 | 70 | 110 |
| Irg. 651 | 1 | 1 | 1 | 1 |
| BXX5627 | 1 | 1 | 1 | 1 |
| MEHQ | 0.05 | 0.05 | 0.05 | 0.05 |
| [Properties] Polymer: | | | | |
| Tg (° C.) | 100 | 100 | 100 | 30 |
| Mw | 110000 | 110000 | 110000 | 110000 |
| Transfer layer: | | | | |
| Tg (° C.) | 0 | 0 | 0 | 0 |
| Tg after UV | 70 | 70 | 70 | 30 |
| UV rad. time (sec) | 1 | 1 | 1 | 1 |
| Residual stress (Pa) | 358 | 287 | 1934 | 287 |
| Initial stress (Pa) | 500 | 400 | 2000 | 400 |
| Relaxation time (sec) | 3 | 3 | 30 | 3 |
| [Evaluation] Initial Pit transferring | | | | |
| Depth of pits | ○ | ○ | Δ | Δ |
| Modulation | ○ | ○ | Δ | Δ |
| Jitter | ○ | ○ | Δ | Δ |
| Pit transferring after test | | | | |
| Depth of pits | ○ | ○ | X | X |
| Modulation | ○ | ○ | X | X |
| Jitter | ○ | ○ | X | X |

The photo-curable transfer sheets obtained from Examples 5 and 6 show excellent transferring property of pits. In contrast, the photo-curable transfer sheets obtained from Comparison Examples 4 and 5 show inferior transferring property of pits and its durability because they do not satisfy any of the definitions of initial stress, relaxation time and Tg after curing according to the invention.

INDUSTRIAL APPLICABILITY

The use of the photo-curable transfer sheet of the invention brings a about rapid preparation of an optical information recording medium having high accuracy.

The invention claimed is:

1. A photo-curable transfer sheet having a photo-curable transfer layer comprising a photo-curable composition deformable by application of pressure,
   wherein the photo-curable composition comprises a polymer having a glass transition temperature of not less than 80° C., and a reactive diluent having a photopolymerizable functional group,
   wherein the photo-curable composition further contains diisocyanate.

2. The photo-curable transfer sheet as defined in claim 1, wherein the photo-curable composition has a glass transition temperature of less than 20° C.

3. The photo-curable transfer sheet as defined in claim 1, wherein the photo-curable transfer layer has an initial stress before being subjected to ultraviolet exposure and a relaxation time required for the initial stress to change 1/e thereof, the initial stress being not more than 600 Pa, the relaxation time being not more than 10 seconds, and the initial stress and the relaxation time being obtained by creep recovery measurement.

4. The photo-curable transfer sheet as defined in claim 3, wherein the relaxation time is in the range of 0.5 to 8 seconds.

5. The photo-curable transfer sheet as defined in claim 1, wherein the photo-curable transfer layer having been subjected to ultraviolet exposure of 300 mJ/cm$^2$ has a glass transition temperature of not less than 65° C.

6. The photo-curable transfer sheet as defined in claim 1, wherein the photo-curable transfer layer having been subjected to ultraviolet exposure for t2 time period (second) has residual stress (S) of not more than 500 Pa, the residual stress being represented by the following formula:

$$S = S_0 \times e^{-t2/t1}$$

in which $S_0$ represents the initial stress (Pa) of the photo-curable transfer layer before being subjected to ultraviolet exposure, and t1 represents the relaxation time required for the initial stress to change 1/e thereof.

7. The photo-curable transfer sheet as defined in claim 1, wherein the polymer having a glass transition temperature of not less than 80° C. is acrylic resin.

8. The photo-curable transfer sheet as defined in claim 7, wherein the acrylic resin has at least 50% by weight of recurring unit of methyl methacrylate.

9. The photo-curable transfer sheet as defined in claim 7, wherein the acrylic resin has a photopolymerizable functional group.

10. The photo-curable transfer sheet as defined claim 7, wherein the acrylic resin is a copolymer of methyl methacrylate, at least one alkyl (meth)acrylate whose alkyl has 2 to 10 carbon atoms and glycidyl (meth)acrylate, the glycidyl group being reacted with carboxylic acid having a photopolymerizable functional group.

11. The photo-curable transfer sheet as defined claim 7, wherein the acrylic resin is a copolymer of methyl methacrylate, at least one alkyl (meth)acrylate whose alkyl has 2 to 10 carbon atoms and carboxylic acid having a photopolymerizable functional group, a carboxyl group of the carboxylic acid being reacted with glycidyl (meth)acrylate.

12. The photo-curable transfer sheet as defined in claim 7, wherein the acrylic resin has a hydroxyl group.

13. The photo-curable transfer sheet as defined in claim 7, wherein the acrylic resin is a copolymer of methyl methacrylate, at least one alkyl (meth)acrylate whose alkyl has 2 to 10 carbon atoms and at least one hydroxyalkyl (meth)acrylate whose hydroxyalkyl has 2 to 4 carbon atoms.

14. The photo-curable transfer sheet as defined in claim 1, wherein the polymer having a glass transition temperature of not less than 80° C. has number average molecular weight of not less than 100,000.

15. The photo-curable transfer sheet as defined in claim 1, wherein the polymer having a glass transition temperature of not less than 80° C. has weight average molecular weight of not less than 100,000.

16. The photo-curable transfer sheet as defined in claim 1, wherein the photo-curable composition contains 0.1 to 10% by weight of a photopolymerization initiator.

17. The photo-curable transfer sheet as defined in claim 1, which has light transmittance of not less than 70% in the range of wavelengths of 380 to 420 nm.

18. The photo-curable transfer sheet as defined in claim 1, which has light transmittance of not less than 70% in the range of wavelengths of 380 to 800 nm.

19. The photo-curable transfer sheet as defined in claim 1, wherein the photo-curable transfer layer has a thickness of 5 to 300 μm.

20. The photo-curable transfer sheet as defined in claim 1, wherein a release sheet is provided on one side or both sides of the photo-curable transfer layer.

21. The photo-curable transfer sheet as defined in claim 20, which is in the form of continuous length, and has the approximately same width as the release sheet.

22. A process for the preparation of an optical information recording medium comprising of the steps (2) to (4):
   a step (2) of removing the release sheet on one side of the photo-curable transfer sheet as defined in claim 20, in case the photo-curable transfer sheet has the release sheets on the both sides,
   a step (3) of placing the photo-curable transfer sheet on an uneven surface of a reflective layer, such that the photo-curable transfer layer is in contact with the uneven surface, the reflective layer being formed on an uneven surface of a substrate having the uneven surface of recorded pits and/or grooves, and depressing the photo-curable transfer sheet and the substrate to form a laminate in which the one side of the photo-curable transfer sheet adheres closely to the uneven surface of the reflective layer, and
   a step (4) of removing the release sheet on the other side of the photo-curable transfer layer of the laminate.

23. The process for the preparation of an optical information recording medium as defined in claim 22,
   wherein prior to the step (2), the following step (1) is performed:
   a step (1) of punching out a disc from the photo-curable transfer sheet, or
   a step (1) of punching out a disc comprising the photo-curable transfer layer and the release sheet on one side of the photo-curable transfer sheet from the photo-curable transfer sheet without punching out the other side release sheet.

24. The process for the preparation of an optical information recording medium as defined in claim 22,
   wherein after the step (4), the following steps (5) and (6) are performed:
   a step (5) of placing an uneven surface of a stamper having the uneven surface of recorded pits and/or grooves on the surface having no release sheet of the laminate, and depressing the photo-curable transfer sheet and the stamper to form a laminate in which the surface of the photo-curable transfer layer adheres closely to the uneven surface of the stamper, and
   a step (6) of exposing the laminate having the stamper to ultraviolet rays to cure the photo-curable transfer layer, and removing the stamper from the laminate to form an uneven surface on the photo-curable transfer layer.

25. The process for the preparation of an optical information recording medium as defined in claim 24, wherein the ultraviolet exposure of the step (6) is carried out in irradiation energy of 300 to 800 mJ/cm$^2$.

26. The process for the preparation of an optical information recording medium as defined in claim 24, wherein the ultraviolet exposure of the step (6) is carried out for 0.5 to 1.5 second.

27. The process for the preparation of an optical information recording medium as defined in claim 24, wherein the photo-curable transfer layer obtained after the step (6) has a glass transition temperature of not less than 65° C.

28. The process for the preparation of an optical information recording medium as defined in claim 24,
   wherein after steps (5) and (6), the following step (7) is performed:
   a step (7) of forming a reflective layer on the uneven surface of the photo-curable transfer layer.

29. An optical information recording medium comprising the photo-curable transfer layer as defined in claim 1 which is cured.

* * * * *